United States Patent
Callahan, II et al.

(10) Patent No.: US 6,415,433 B1
(45) Date of Patent: Jul. 2, 2002

(54) METHOD AND SYSTEM FOR IDENTIFYING LOCATIONS TO MOVE PORTIONS OF THE COMPUTER PROGRAM

(75) Inventors: Charles David Callahan, II; Brian D. Koblenz, both of Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,031

(22) Filed: Dec. 23, 1998

(51) Int. Cl.[7] .............................................. G06F 9/45
(52) U.S. Cl. ...................... 717/9; 717/4; 717/5; 717/6; 717/7; 717/8
(58) Field of Search ................ 717/9, 7, 8, 4; 712/241; 707/527

(56) References Cited

U.S. PATENT DOCUMENTS 4,819,234 A    4/1989  Huber (List continued on next page.)

FOREIGN PATENT DOCUMENTS

| DE | 19710252 | 2/1998 |
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

TERA MTA Principles of Operation, Nov. 18, 1997.
Davidson, Jack W. and Whally, David B., "Reducing the Cost of Branches by Using Registers," Proceedings of the 17th Annual Symposium on Computer Architecture, Seattle, Washington, May 28–31, 1990.

(List continued on next page.)

Primary Examiner—Mark R. Powell
Assistant Examiner—Chameli Chaudhuridas
(74) Attorney, Agent, or Firm—Perkins Coie LLP

(57) ABSTRACT

A method system for optimizing a computer program. In one embodiment, the system identifies depths of blocks of a computer program and identifies the availability of expressions of the computer program. The system then modifies the computer program when he identified availability of the expression and the identified depth of a block indicate that the expression can be moved to the block. The depth of the block may represent the number of dominator blocks of that block. The availability of the expression may represent the depth of a block to which the expression may be moved. In one embodiment, when the identified availability of the expression is less than the identified depth of the block, the expression can be moved to the block.

80 Claims, 21 Drawing Sheets

U.S. PATENT DOCUMENTS

| | | | |
|---|---|---|---|
| 4,872,167 A | | 10/1989 | Maezawa et al. |
| 5,168,554 A | | 12/1992 | Luke |
| 5,175,856 A | * | 12/1992 | Dyke et al. .................... 717/4 |
| 5,301,325 A | * | 4/1994 | Benson .......................... 717/7 |
| 5,333,280 A | * | 7/1994 | Ishikawa et al. ............ 712/241 |
| 5,355,494 A | * | 10/1994 | Sistare et al. ................... 717/6 |
| 5,450,575 A | * | 9/1995 | Sites .............................. 717/7 |
| 5,504,932 A | | 4/1996 | Vassiliadis et al. |
| 5,533,192 A | | 7/1996 | Hawley et al. |
| 5,557,761 A | | 9/1996 | Chan |
| 5,564,051 A | | 10/1996 | Halliwell et al. |
| 5,572,148 A | * | 11/1996 | Lytle et al. .................... 326/41 |
| 5,581,764 A | | 12/1996 | Fitzgerald et al. |
| 5,594,864 A | | 1/1997 | Trauben |
| 5,598,560 A | * | 1/1997 | Benson .......................... 717/7 |
| 5,632,032 A | | 5/1997 | Ault et al. |
| 5,649,203 A | * | 7/1997 | Sites .............................. 717/9 |
| 5,652,889 A | * | 7/1997 | Sites .............................. 717/8 |
| 5,712,996 A | | 1/1998 | Schepers |
| 5,754,855 A | | 5/1998 | Miller et al. |
| 5,768,591 A | | 6/1998 | Robinson |
| 5,768,592 A | * | 6/1998 | Chang ........................... 717/4 |
| 5,774,721 A | | 6/1998 | Robinson |
| 5,805,892 A | | 9/1998 | Nakajima |
| 5,812,811 A | | 9/1998 | Dubey et al. |
| 5,826,265 A | | 10/1998 | Van Huben et al. |
| 5,867,643 A | | 2/1999 | Sutton |
| 5,877,766 A | | 3/1999 | Bates et al. |
| 5,887,166 A | | 3/1999 | Mallick et al. |
| 5,901,315 A | | 5/1999 | Edwards et al. |
| 5,903,730 A | | 5/1999 | Asai et al. |
| 5,913,925 A | | 6/1999 | Kahle et al. |
| 5,787,245 A | | 7/1999 | You et al. |
| 5,930,142 A | * | 7/1999 | Schleicher et al. ..... 364/474.31 |
| 5,953,530 A | | 9/1999 | Rishi et al. |
| 5,961,639 A | | 10/1999 | Mallick et al. |
| 5,966,539 A | * | 10/1999 | Srivastava ..................... 717/9 |
| 5,978,902 A | | 11/1999 | Mann |
| 6,002,872 A | | 12/1999 | Alexander, III et al. |
| 6,002,879 A | * | 12/1999 | Radigan et al. ............. 707/527 |
| 6,009,269 A | | 12/1999 | Burrows et al. |
| 6,029,005 A | * | 2/2000 | Radigan ........................ 717/9 |
| 6,049,671 A | | 4/2000 | Slivka et al. |
| 6,058,493 A | | 5/2000 | Talley |
| 6,059,840 A | | 5/2000 | Click, Jr. |
| 6,072,952 A | | 6/2000 | Janakiraman |
| 6,094,716 A | | 7/2000 | Witt |
| 6,101,524 A | | 8/2000 | Choi et al. |
| 6,112,293 A | | 8/2000 | Witt |
| 6,117,185 A | * | 9/2000 | Schmidt ........................ 717/9 |
| 6,151,701 A | | 11/2000 | Humphreys et al. |
| 6,151,704 A | * | 11/2000 | Radigan ........................ 717/9 |
| 6,226,789 B1 | * | 5/2001 | Tye et al. ....................... 717/7 |

OTHER PUBLICATIONS

Knoops, Jens et al., "The Power of Assignment Motion," ACM SIGPLAN '95 Conference on Programming Language Design and Implementation, La Jolla, California, Jun. 18–21, 1995.

Agrawal, Hiralal, "Dominators, Super Blocks, and Program Coverage," 21st ACM SIGPLAN–SIGACT Symposium on Principles of Programming Languages, Portland, Oregon, Jan. 17–21, 1994.

Lang, Thomas and Huguet, Miquel, "Reduced Register Saving/Restoring in Single–Window Register Files," Computer Architecture News, vol. 14, No. 3, Jun. 1986.

Goldman, Kenneth, J., "Introduction to Data Structures," 1996 (retrieved from Internet, http://www.cs.wustl.edu{kjg/CS101_SP97/Notes?DataStructures/structures.html.

Ram, A., et al., "Parallel Garbage Collection Without Synchronization Overhead," 12th Annual Symposium on Computers Architecture, Jun. 17, 1985.

Hayashi, H. et al. "ALPHA: A High Performance Lisp Machine Equipped with a New Stack Structure and Garbage Collection System," 10th Annual International Symposium on Computer Architecture, 1983.

Minwen, Ji et al., "Performance Measurements for Multi–threaded Programs," SIGMETRICS '98, ACM, 1998, pp. 168–170.

Cook, Jonathan E. and Wolf, Alexander L., "Event Based Detection of Concurrency," SIGSOFT '98 ACM, 1998, pp. 34–45.

Jenn–Yuan Tsai et al, "Performance Study of a Concurrent Multithreaded Processor," IEEE, 1998, pp. 24–35.

"Method of Tracing Events in Multi–Threaded OS/2 Applications," IBM Tech. Disclosure Bulletin, Sep. 1993, pp. 19–22.

Kolte, Priyadarshan and Harrold, Mary Jean, "Load/Store Range Analysis for Global Register Allocation," ACM–SIGPLAN, Jun. 1993.

Lal, George and Appel, Andrew W., "Iterated Register Coalescing," ACM Transactions on Programming Languages and Systems, vol. 18, No. 3, May 1996, pp. 300–324.

Chow, Fred C. and Hennessy, John L., "The Priority–Based Coloring Approach to Register Allocation," ACM Transactions on Programming Languages and Systems, vol. 12, No. 4, Oct. 1990, pp. 501–536.

Briggs, Preston et al., "Coloring Heuristics for Register Allocation," Department of Computer Science, Rice University, Houston, Texas, Jun. 1989.

Briggs, Preson et al., "Coloring Register Pairs," ACM Letters on Programming Languages and Systems, vol. 1, No. 1, Mar. 1992, pp. 3–13.

Shim, SangMin and Moon, Soo–Mook, "Split–Path Enhanced Pipelin Scheduling for Loops with Control Flows," IEEE, Dec. 2, 1998.

Callahan, David Koblenz, Brian, "Register Allocation via Hierarchical Graph Coloring," Proceedings of the ACM SIGPLAN '91 Conference on Programming Language Design and Implementation, Toronto, Canada, Jun. 26–28, 1991.

Smith, Burton, "The End of Architecture," Keynote Address Presented at the $17^{th}$ Annual Symposium on Computer Architecture, Seattle, Washington, May 29, 1990.

Richard Korry et al., "Memory Management in the Tera MTA System," 1995.

Smith, Burton, "Opportunities for Growth in High Performance Computing," Nov., 1994.

Gail Alverson et al., "Processor Management in the Tera MTA System," 1995.

Major System Characteristics of the TERA MTA, 1995.

Touzeau, Roy F., "A Fortran Compiler for the FPS–164 Scientific Computer," Proceedings of the ACM SIGPLAN '84 Symposium on Computer Construction, SIGPLAN Notices 19(6):48–57, Jun. 1984.

Linton, Mark A., "The Evolution of Dbx," USENIX Summer Conference, Jun. 11–15, 1990.

David Callahan and Burton Smith, A Future–Based Parallel Language for a General–Purpose Highly–Parallel Computer, Languages and Compilers for Parallel Computing, MIT Press, 1990.

David Callahan et al., "Improving Register Allocation for Subscripted Variables," Proceedings of the ACM SIGPLAN Conference on Programming Language Design and Implementation, White Plains, New York, Jun. 20–22, 1990.

Adelberg, Brad et al., "The Strip Rule System for Efficiently Maintaining Derived Data," Sigmod Record, Association for Computing Machinery, New York, vol. 26, No. 2, Jun. 1, 1997.

Surajit, Chaudhuri and Umeshwar Dayal, "An Overview of Data Warehousing and OLAP Technology," Sigmod Record, Association for Computing, New York, vol. 26, No. 1, Mar. 1997.

Agrawal, Gagan and Joel Saltz, "Interprocedural Data Flow Based Optimizations for Compilation of Irregular Problems," Annual Workshop on Languages and Compilers for Parallel Computing, 1995.

Callahan, David, "Recognizing and Parallelizing Bounded Recurrences," Aug. 1991.

D.H. Bailey et al., "The NAS Parallel Benchmarks—Summary and Preliminary Results," Numerical Aerodynamic Simulation (NAS) Systems Division, NASA Ames Research Center, California, 1991.

Robert Alverson et al, "The Tera Computer System,"Proceedings of 1990 ACM International Conference on Supercomputing, Jun. 1990.

Gail Alverson et al., "Scheduling on the Tera MTA," Job Scheduling Strategies for Parallel Processing, 1995.

Smith, Burton, The Quest for General–Purpose Parallel Computing.

Briggs, Preston and Keith D. Cooper, "Effective Partial Redundancy Elimination," ACM SIGPLAN Notices, Association for Computing Machinery, New York, vol. 29, No. 6, Jun. 1, 1994.

Click, Cliff, "Global Code Motion, Global Value Numbering," ACM SIGPLAN Notices, Association for Computing Machinery, New York, vol. 30, No. 6, Jun. 1, 1995.

Sreedhar, Vurgranam C. and Guang R. Gao, "Incremental Computation of Dominator Trees," ACM SIGPLAN Notices, Association for Computing Machinery, New York, vol. 30, No. 3, Mar. 1, 1995.

Galarowicz, Jim et al., "Analyzing Message Passing Programs on the Cray T3E with PAT and VAMPIR," Research Report, "Online!", May 1998.

Anderson, Jennifer, et al., "Continuous Profiling: Where Have All The Cycles Gone?," Operating Systems Review, ACM Headquarters, New York, vol. 31, No. 5, Dec. 1, 1997.

Anderson, Gail et al., "Tera Hardware–Software Cooperation," Proceedings of Supercomputing 1997, San Jose, California, Nov. 1997.

* cited by examiner

METHOD AND SYSTEM FOR IDENTIFYING LOCATIONS TO MOVE PORTIONS OF THE COMPUTER PROGRAM

TECHNICAL FIELD

The present invention relates generally to compilation of computer programs and, more particularly, to the optimization of computer programs.

BACKGROUND OF THE INVENTION

Computer programs can be very complex and consume enormous amounts of computational resources when executed. For example, a computer program that models the weather over the entire earth may model the weather to an accuracy of a square mile of the surface of the earth and at elevations that are multiples of 1000 feet. Thus, a complex computation may need to be performed for each square mile of the surface of the earth at various elevations. In addition, the complex computation may need to be repeated multiple times to simulate the changing weather conditions. Such complex computer programs, in practice, can only be executed on the fastest supercomputers. Even when executing such complex computer programs on a supercomputer, they may take too long to execute to be practical. Moreover, even less complex computer programs may consume enough computational resources so that a user of the computer program becomes frustrated with the speed of execution. For example, a user may replace a spreadsheet program that is slow at performing a recalculation with another spreadsheet program that can perform the recalculation much faster.

Computer programmers devote considerable effort to improving the efficiency of the computer programs that they develop. However, because of the complexities of the computer programs, programmers may not have the time to fully understand all the improvements that can be made. As a result, compilers often include an extensive optimization phase in which the compiler attempts to optimize (i.e., improved efficiency of) the computer program that is being compiled. Also, some optimizers have been developed to analyze and optimize executable code. The goal of these optimizers is to generate code that is as efficient as could possibly be generated by a programmer. Although no optimizer has achieved that goal, in practice, optimizers can significantly improve efficiency of a computer program. For example, if an optimizer can identify a statement whose execution can be removed from inside a loop that is executed for each square mile of the surface of the earth, then the computational efficiency of the program is improved. Although such an optimization may result in a relatively small increase in the overall speed of execution of the computer program, the effect of many such optimizations can be significant. Various optimization techniques are described "Compilers: Principles, Techniques, and Tools," Aho, Sethi, and Ullman, Addison-Wesley, 1988, which is hereby incorporated by reference.

SUMMARY OF THE INVENTION

Embodiments of the present invention provide a method system for optimizing a computer program. In one embodiment, the system identifies depths of blocks of a computer program and identifies the availability of expressions of the computer program. The system then modifies the computer program when he identified availability of the expression and the identified depth of a block indicate that the expression can be moved to the block. The depth of the block may represent the number of dominator blocks of that block. The availability of the expression may represent the depth of a block to which the expression may be moved. In one embodiment, when the identified availability of the expression is less than the identified depth of the block, the expression can be moved to the block.

Another aspect of the present invention determines the availability of expressions of a computer program. The system for determining such availability visits blocks of the computer program during a forward traversal of a control flow graph representing that computer program. For each expression of each block visited, the system sets the availability of the expression based on the reaching definition when the operation of the expression is a load from memory. The system also sets the availability of an expression to the latest availability of its operands when the operation is not store from memory. The setting of the availability of the expression based on the reaching definition may include the setting of the availability of the expression to the availability of the reaching definition when the reaching definition is a store of the result of expression with the same value as the value of the expression.

Another aspect of the present invention identifies a direct dominator of a block of the computer program. To identify the direct dominator, the system identifies the closest dominator of the block such that the block is contained in the inner most region containing that dominator. That identified closest dominator is the direct dominator of the block. In one embodiment, the system identifies the direct dominator by first selecting the closest dominator of the block. The system then selects the least common region that contains the region that contains the block and the region that contains the selected dominator of the block. The system then loops searching for the least common region that is the same as an inner most region of a currently selected dominator.

DETAILED DESCRIPTION OF THE INVENTION

Identifying Depth and Availability

Embodiments of the present invention provide techniques for identifying an earlier location in a path of execution of a computer program to which an expression of the computer program can be moved. The code mover ("CM") system of the present invention attempts to identify the earliest location within the computer program to which each expression can be moved without re-writing the expression, which is referred to as the "depth" of the expression. The CM system also attempts to identify the earliest location within the computer program to which each expression can be moved with re-writing the expression, which is referred to as the "avail" or "availability" of the expression. The depth and avail of the expressions can be used by various compilation processes. For example, if the depth of an expression within a loop is at the preheader of the loop or before, then the expression is invariant and can be moved outside the loop. If the avail of an expression within a loop is at the preheader of the loop or before, then the expression is also invariant and can be moved outside the loop if the expression is re-written. The CM system also identifies a depth of each block of the computer program. The depth of a block indicates the depth of the immediate dominator block in a dominator tree for the computer program.

When a block "b" dominates an expression "e" and the depth of the expression ("depth(e)") is less than or equal to the depth of the block ("depth(b)"), then the expression and its operands can be moved to block. Also, if the avail of the expression ("avail(e)") is less than or equal to the depth of the block, then the expression can be moved to the block after some intermediate computations have been moved to the block.

Figure 1:
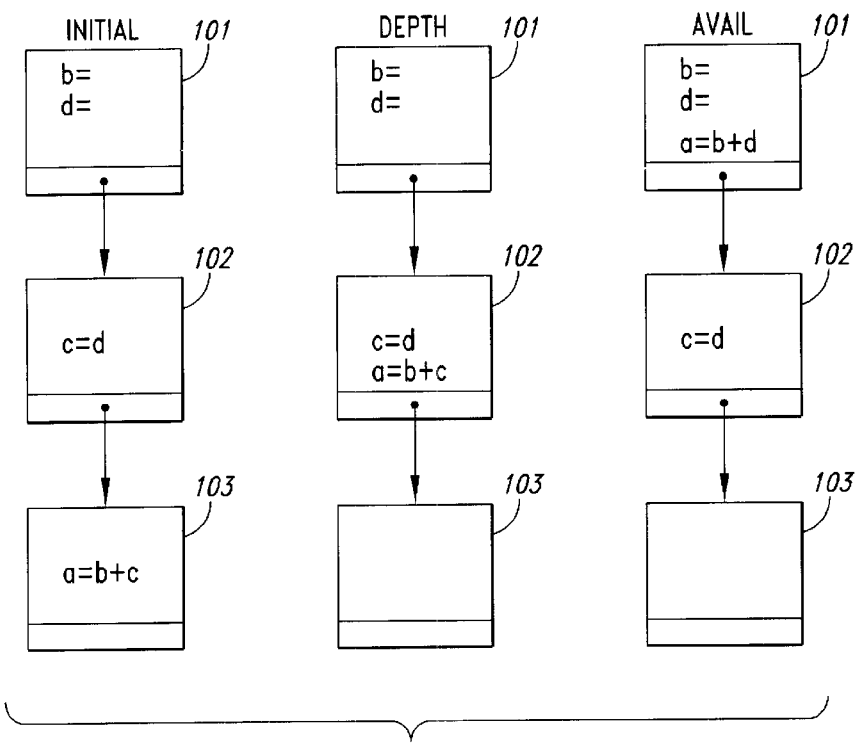
FIG. 1 illustrates differences between the depth and avail values.

FIG. 1 illustrates differences between the depth and avail values. The initial graph illustrates that block 101 contains the assignments "b= . . . " and "d= . . . ," block 102 contains the assignment "c=d," and block 103 contains the assignment "a=b+c." The depth graph illustrates that the assignment "a=b+c" can be moved to block 102 because variables "b" and "c" are available in block 102. However, the assignment "a=b+c" cannot be moved to block 101 because of the assignment "c=d" in a block 102. The avail graph illustrates that the assignment "a=b+c" can be moved to block 101 if the assignment "a=b+c" is changed to the equivalent assignment "a=b+d."

Figure 2:
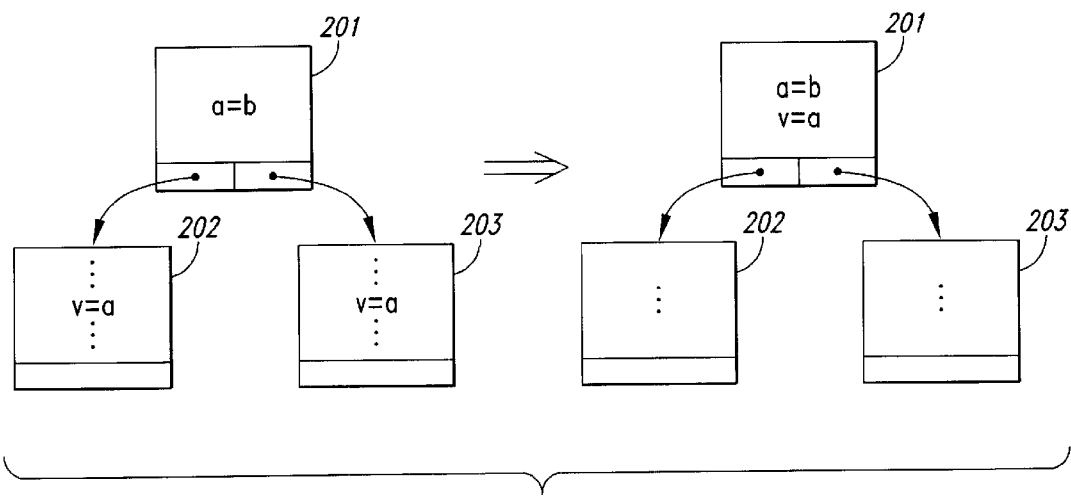
FIG. 2 illustrates a portion of a control flow graph that can benefit by code movement when both paths of a conditional branch have the same assignment statement.

FIG. 2 illustrates a portion of a control flow graph that can benefit by code movement when both paths of a conditional branch have the same assignment statement. The graph on the left represents the blocks of the portion before code movement, and the graph on the light represents the blocks of the portion after code movement. Initially, blocks 202 and 203 contain assignments "V=a." Block 201 contains an assignment "a=b." The assignment "V=a" can be removed from both blocks 202 and 203 and replaced by an assignment "V=a" in block 201. This removal and replacement is shown in the graph on the right. This removal and replacement results not only in smaller object code, but also other code movement may be available because there is only one occurrence of the assignment "V=a." This code movement, of course, assumes that the variables "a" and "V" are not reassigned in between the assignment "a=b" and assignment "V=a."

Figure 3A:
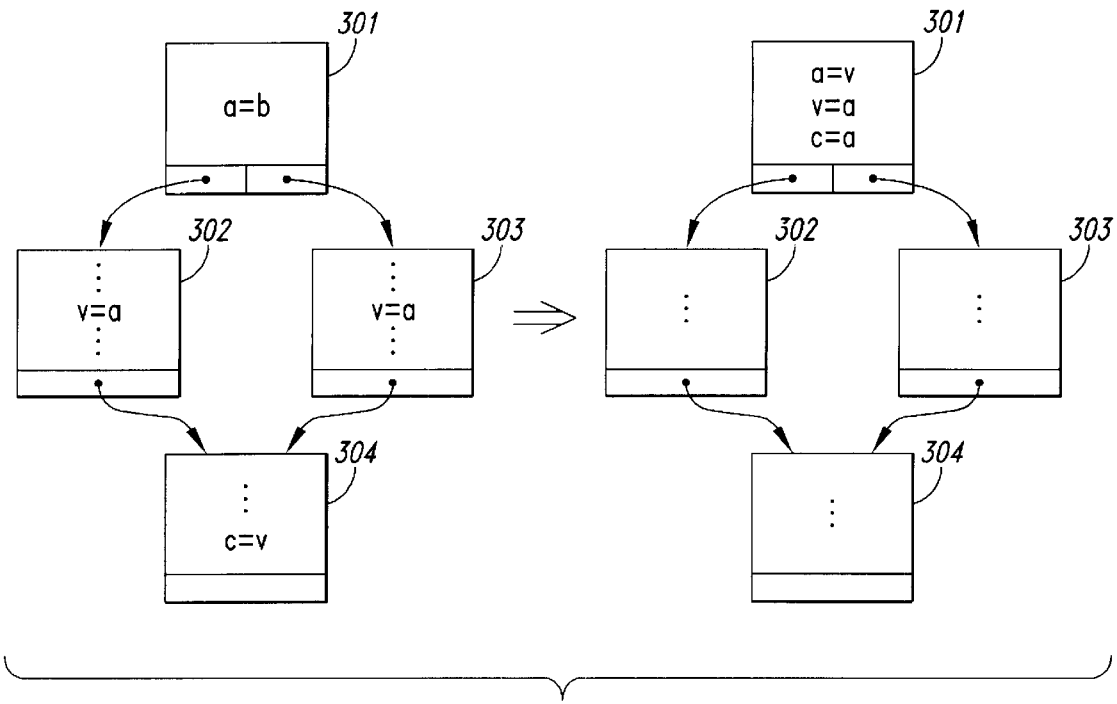
FIG. 3A illustrates a portion of a control full graph that can benefit by code movement when both paths of a conditional branch have the same assignment statement and re-join later.

FIG. 3A illustrates a portion of a control flow graph that can benefit by code movement when both paths of a conditional branch have the same assignment statement and re-join later. The graph on the left represents the blocks of the portion before code movement, and the graph on the right represents the blocks of the portion after code movement. This portion may correspond to an "if-then-else" statement. Initially, block 301 contains the assignment "a=b," blocks 302 and 303 contained the assignment "V=a," and block 304 contains the assignment "c=V." Since the assignments "V=a" can be moved to block 301 has indicated by FIG. 2, the assignment "c=V" can also be moved to block 301. The removal and replacement is shown in the graph on the right.

Figure 3B:
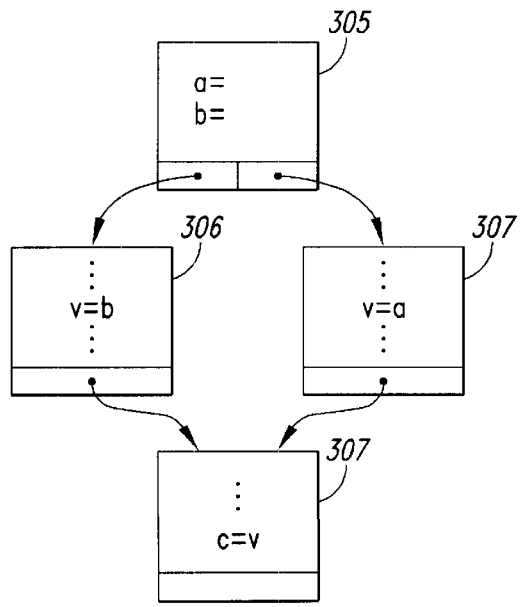
FIG. 3B illustrates a code portion of control flow graph that cannot benefit from the b code movement of FIG. 3A.

FIG. 3B illustrates a code portion of control flow graph that cannot benefit from the code movement of FIG. 3A. In this example, each path of the "if-then-else" statement has a different assignment for variable "V," that is block 306 has the assignment "V=b" and block 307 has the assignment "V=a." Thus, these assignments cannot be moving to block 305, and the assignment "c=V" also cannot be moved.

Figure 4:
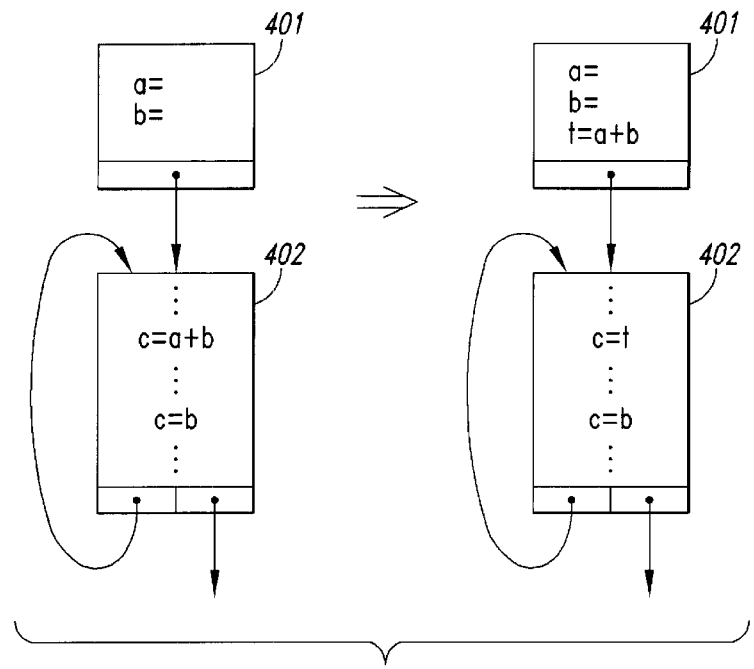
FIG. 4 illustrates a portion of a control flow graph representing code that can benefit from code movement.

FIG. 4 illustrates a portion of a control flow graph representing code that can benefit from code movement. The graph on the left represents the blocks of the portion before code movement, and the graph on the right represents the blocks of the portion after code movement. Block 402 represents a loop, and block 401 represents the pre-header of the loop. The loop contains the assignment "c=a+b," and variables "a" and "b" are invariant within the loop. Thus, the calculation of the value "a+b" used in the loop can be moved to the pre-header. The graph on the right illustrates the placing of the calculation in the pre-header. Thus, the calculation needs all it to be performed once each time the loop is performed.

Figure 5:
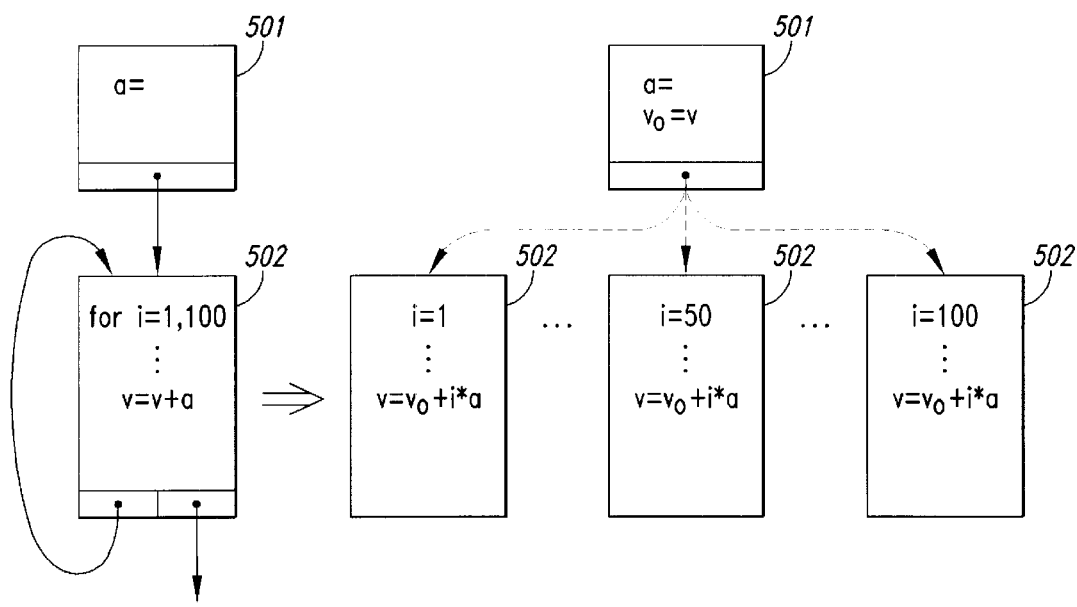
FIG. 5 illustrates a portion of a control flow graph representing code that can benefit from knowing that a variable is invariant within a loop.

FIG. 5 illustrates a portion of a control flow graph representing code that can benefit from knowing that a variable is invariant within a loop. The graph on the left represents the blocks of a portion before code movement, and the graph on the right represents the blocks after code movement. Block 502 represents the loop, and block 501 represents the pre-header of the loop. The loop represents a "for" loop that is executed 100 times with the index "i" being incremented from 1 to 100. The assignment "V=V+a" within the loop can be re-written by the following assignment "V=V0+i*a," where "V0" is the initial value of the variable "V" when the loop starts (assuming that the variable "a" is invariant within). By rewriting the assignment statement, each of the 100 executions of the loop can be performed in parallel, because the values of the variables from one execution to the next are no longer dependent. The graph on the right illustrates this parallel execution of the loop.

In one embodiment, the CM system inputs a control flow graph and annotates each expression with its depth and avail and each block with its depth. Alternatively, these values can be calculated dynamically as they are needed by a compilation process. The input control flow graph includes basic blocks ("blocks") and edges between the blocks. The control flow graph includes a single "preheader" for each loop that, when the loop is irreducible, may have multiple successors in the loop. Such a preheader dominates all nodes in the loop. If a block is a head of a back edge, it is the "top" of a loop and is a successor of the preheader of the loop.

Each block has a list of expressions. The expressions have pointers to operand expressions earlier in the block.

The control flow graph may have a special memory operation called a "merge node" (also known as a "phi function") at the beginning of blocks. A merge node for a variable indicates that the predecessor blocks of the block containing the merge node are reached by different "dominating definitions" of the variable. A dominating definition of a path of execution is the definition for a load that is closest to the load on that path of execution. A merge node is a definition of the variable. For example, the flow control graph of FIG. 3A may have a merge operation stored at the beginning of block 304. This merge operation identifies that blocks 302 and 303 have definitions of each expression that is a memory reference (other than a merge operation) has a pointer to the unique memory references that dominates it and there are no references between those memory references that define the memory. That unique memory reference is the "reaching definition" for the memory reference.

Each expression of the input control flow graph also has a "global value number" ("vn"). If two expressions have the same value number, then they result in the same value. If a memory reference is a load whose reaching definition is a store, then the load has the same value number as that expression being stored. For example, in the following expression x(1)=a+b=x(1)

the load of x(1) has the same value number as the expression "a+b." If a memory reference is a load whose reaching definition is a merge, then the load and the reaching definition have the same value number only if the variable represented by the merge is a scalar. If a memory reference is a merge for a scalar and it has the same value number of one of its reaching definitions, then all definitions that reach the memory reference have the same value number.

Aspects of the invention are described using the terms "dominator" and "post-dominator." A dominating block ("dominator") dominates a dominated block when the blocks are distinct and all paths from the start block of the control flow graph to the dominated block contain the dominating block. A dominating block is an immediate dominating block of a dominated block when no other block, that is also dominated by the dominating block, dominates that dominated block. The immediate dominator of a block "b" is "dom(b)."

A post-dominating block ("post-dominator") post-dominates a post-dominated block when the blocks are distinct and all paths from the post-dominated block to the end block of the control flow graph contain the post-dominating block. A post-dominating block is an immediate post-dominating block of a post-dominated block when no other block, that is also post-dominated by the post-dominating block, post-dominates that post-dominated block. The immediate post-dominator of a block "b" is "pdom("b")."

The depth of a block is the number of dominator blocks of that block. The depth of a block may be considered as the level of the block within a "dominator tree." A dominator tree is a representation of the blocks of a flow control graph in which each block has an edge to its immediate dominating block. Since each block only has one immediate dominator, the blocks and the edges form a tree data structure.

The CM system annotates the expressions of a control flow graph with depth and avail, and annotates the blocks with depth. The depth of an expression indicates the depth of highest block in the dominator tree to which the expression can be moved. The avail value of an expression indicates the depth of the highest block in the dominator tree to which the expression can be moved with re-writing. If the depth of an expression is less than or equal to the depth of a block (on its path of execution), then that expression can be moved to that block. If the avail of an expression is less than or equal to the depth of a block (on its path of execution), then the expression can be moved to that block with rewriting. Because an expression cannot be moved before its operands, the depth of an expression is the maximum of the depths of its operands, and the avail of an expression is the maximum of the avails of its operands.

Figure 6:
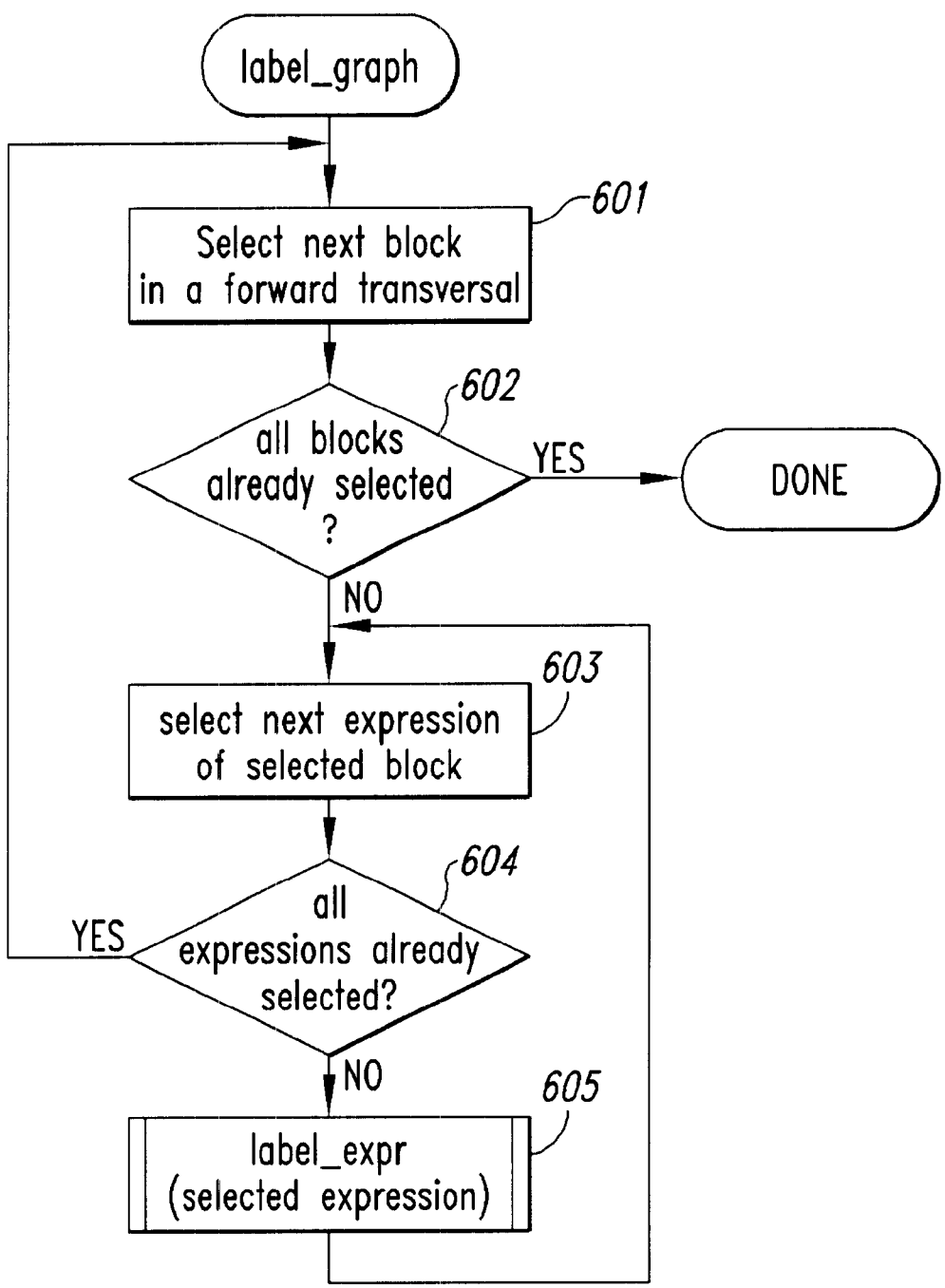
FIG. 6 is a flow diagram of an example implementation a label_graph routine.

FIG. 6 is a flow diagram of an example implementation a label_graph routine. This routine is passed a control flow graph representing a computer program and calculates depth and avail for each expression in the control flow graph. The routine loops selecting each block in a forward traversal of the control flow graph. The routine selects each expression within each block and invokes a routine to calculate depth and avail for the selected expression. A forward traversal of a flow control graph selects each block that is a tail of a forward edge before selecting the block that is the head of that forward edge. In step 601, the routine selects the next block during the forward traversal starting with the first block. In step 602, if all blocks have already been selected, then routine completes, else the routine continues at step 603. In step 603, the routine selects the next expression of the selected block. In step 604, if all the expressions of the selected block have already been selected, then the routine loops to step 601 to select the next block, else the routine continues that step 605. In step 605, the routine invokes the label_expr routine to generate depth and avail for the selected expression. The routine then loops to step 603 to select the next expression of the selected block.

Figure 7:
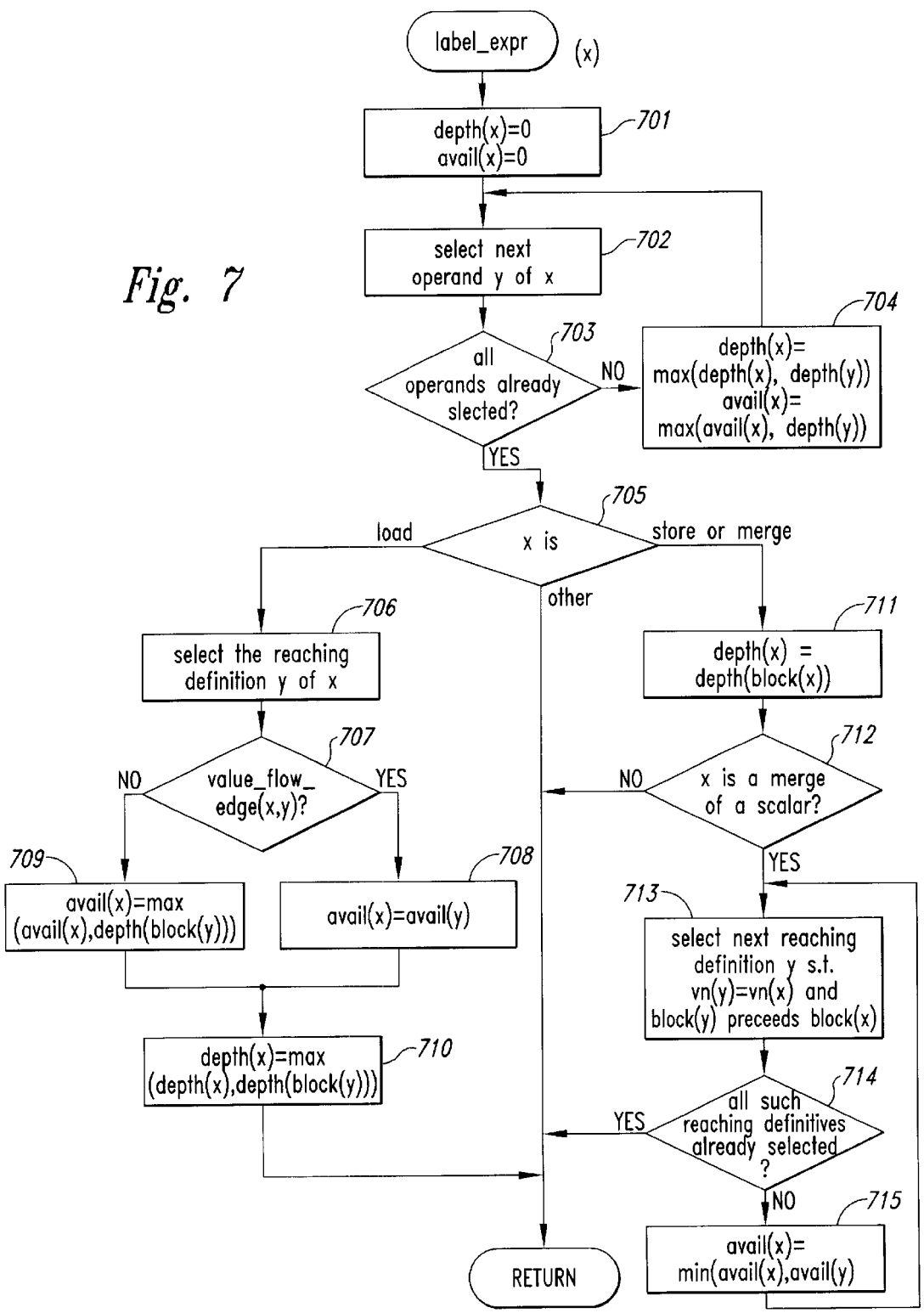
FIG. 7 is a flow diagram of an example implementation of the label_expr routine.

FIG. 7 is a flow diagram of an example implementation of the label_expr routine. This routine calculates its depth and avail for a passed expression. In step 701, the routine initializes the depth and avail for the passed expression to zero. In steps 702–704, the routine sets the depth and avail to the maximum of the depth and avail of the operands of the passed expression. The depth and avail of an expression can be no less than the maximum depth and avail of its arguments. In step 702, the routine selects the next operand of the passed expression. In step 703, if all operands have already been selected, then the routine continues to step 705, else the routine continues at step 704. In step 704, the routine sets the depth of the passed expression to the maximum of the current depth of the passed expression and the depth of the selected operand and sets the avail of the passed expression to the maximum of the current avail of the passed expression and the depth of the selected operand. The routine then loops to step 702 to select the next operand. In step 705, the routine determines whether the passed expression is a load from memory or either a store to memory or a merge. If the passed expression is a load from memory, then the routine continues at step 706. If the passed expression is a store to memory or a merge, then the routine continues at step 711. Otherwise, the routine returns. In steps 706–710, the routine sets the depth and avail for a load expression based on its reaching definition. If the reaching definition is a merge of a scalar or the reaching definition stores the result with a value number that is the same as the load expression, then the avail of the load expression can be set to the avail of the reaching definition. In step 706, the routine selects the reaching definition of the passed expression. In strep 707, the routine invokes the value_flow_edge routine to determine whether the avail value of the load can be set to the avail of the reaching definition with re-writing can be located. If the avail value can be set to that of the reaching definition, then the routine continues at step 708, else the routine continues at step 709. In step 708, the routine sets the avail of the passed expression to the avail of the selected reaching definition. In step 709, the routine sets the avail of the passed expression to the maximum of the current avail of the passed expression and of the depth of the block that contains the selected reaching definition. That is, the load expression cannot be located before its reaching definition even with re-writing. In step 710, the routine sets the depth of the passed expression to the maximum of the current depth of the passed expression and of the depth of the block that contains the selected reaching definition and then returns. That is, the load expression cannot be located before its reaching definition without re-writing. In steps 711–715, the routine sets the depth for a store and a merge and sets the avail for a scalar merge. The depth of a store or a merge is the depth of the block that contains the store or merge. That is, a store or merge cannot be located in or before its immediate dominating block. In step 711, the routine set the depth of the passed expression to the depth of the block that contains the passed expression. In step 712, if passed expression is a merge of a scalar, then the routine continues at step 713, else the routine returns. In steps 713–715, the routine sets the avail of the passed expression to the minimum of its current avail and the minimum of the avail of the reaching definitions whose value number is equal to the value number of the passed expression and that is contained block that already has a depth and avail. In step 713, the routine selects the next reaching definition whose value number equals the value number of the passed expression and that is contained in a block that already had had its depth and avail calculated. In step 714, if all such reaching definitions have already been selected, then the routine returns, else the routine continues that step 715. In step 715, the routine sets the avail of the passed expression equal to the minimum of the current avail of the passed expression and the avail of the selected reaching definitions. The routine then loops to step 713.

Figure 8:
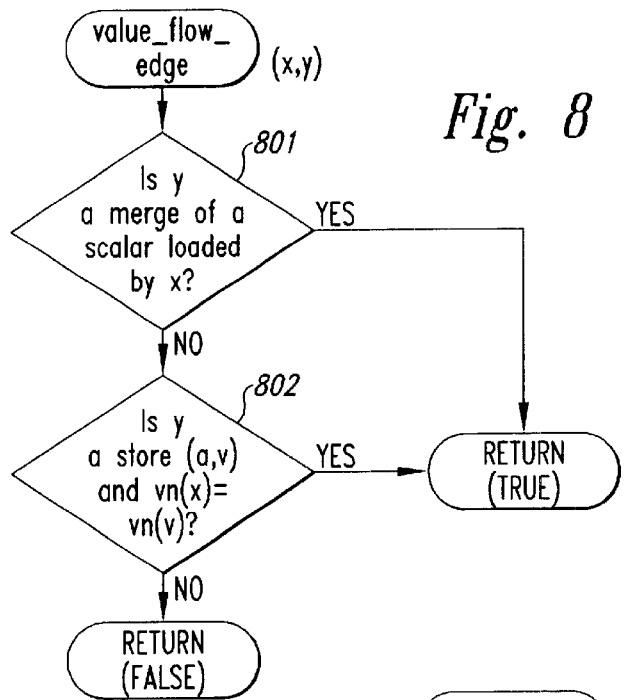
FIG. 8 is a flow diagram of the value_flow_edge routine.

FIG. 8 is a flow diagram of the value_flow_edge routine. This routine is passed an expression along with the reaching definition for that expression. The routine returns as its value an indication of whether the expression can be located with re-writing in the same block as the reaching definition can be located. In step 801, if the reaching definition is a merge of a scalar loaded by the passed expression, then the expression can be so located along with its reaching definition and the routine returns a true indication. In step 802, if the reaching definition is a store and the expression that generates the stored value has the same value number of the passed expression, then the expression can be so located along with its reaching definition. The routine returns a true indication, else the routine returns a false indication.

Figure 9:
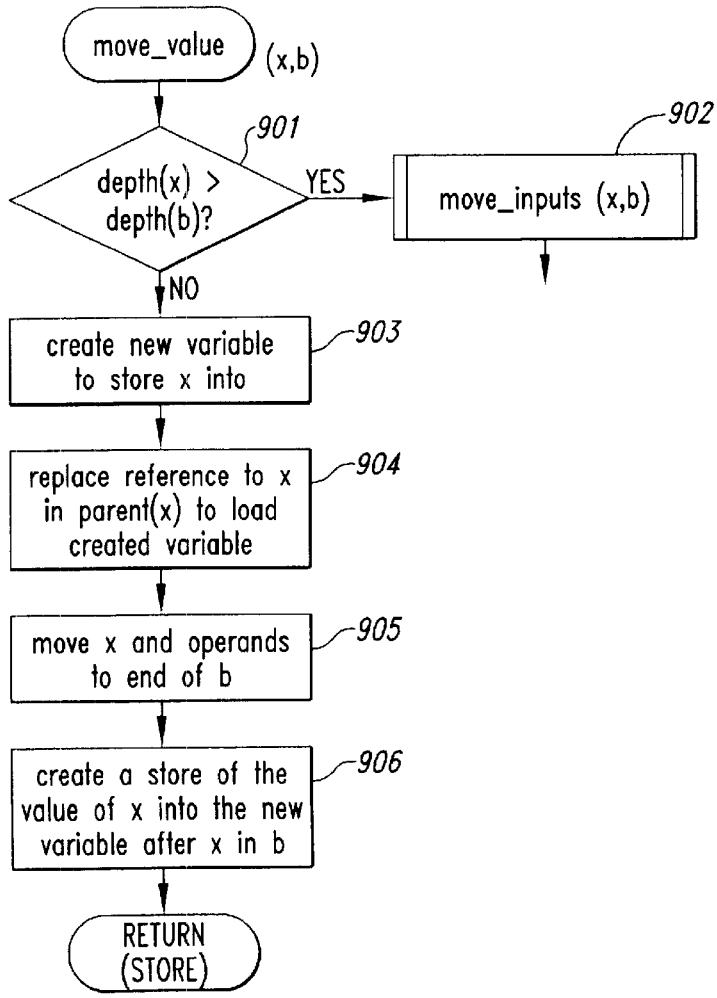
FIG. 9 is a flow diagram of the move_value routine.

The move_value routine uses the depth and avail of an expression and the depth of the blocks to move an expression to a dominating block. FIG. 9 is a flow diagram of the move_value routine. This routine is passed the expression and the block that dominates that expression. If the depth of the expression is greater than the depth of the passed dominating block, then the routine first moves the operands of the expression to the passed dominating block. The routine then stores the result of the expression in the dominating block and replaces the expression with a load of the stored result. In step 901, if the depth of the passed expression is greater than the depth of the passed block, then the routine continues that step 902, else the routine continues at step 903. In step 902, the routine invokes the move_inputs routine passing the passed expression and the passed block. In step 903, the routine creates a new variable in which to store the result of the passed expression. In step 904, the routine replaces the reference to the passed expression in its previous block with a load of the created variable. In step 905, the routine moves the passed expression and its operands to the end of the passed block. In step 906, the routine creates an operation that stores the value of the passed expression into the new variable and inserts that operation after the passed expression in the passed block. The routine then returns an indication of the created store operation.

Figure 10:
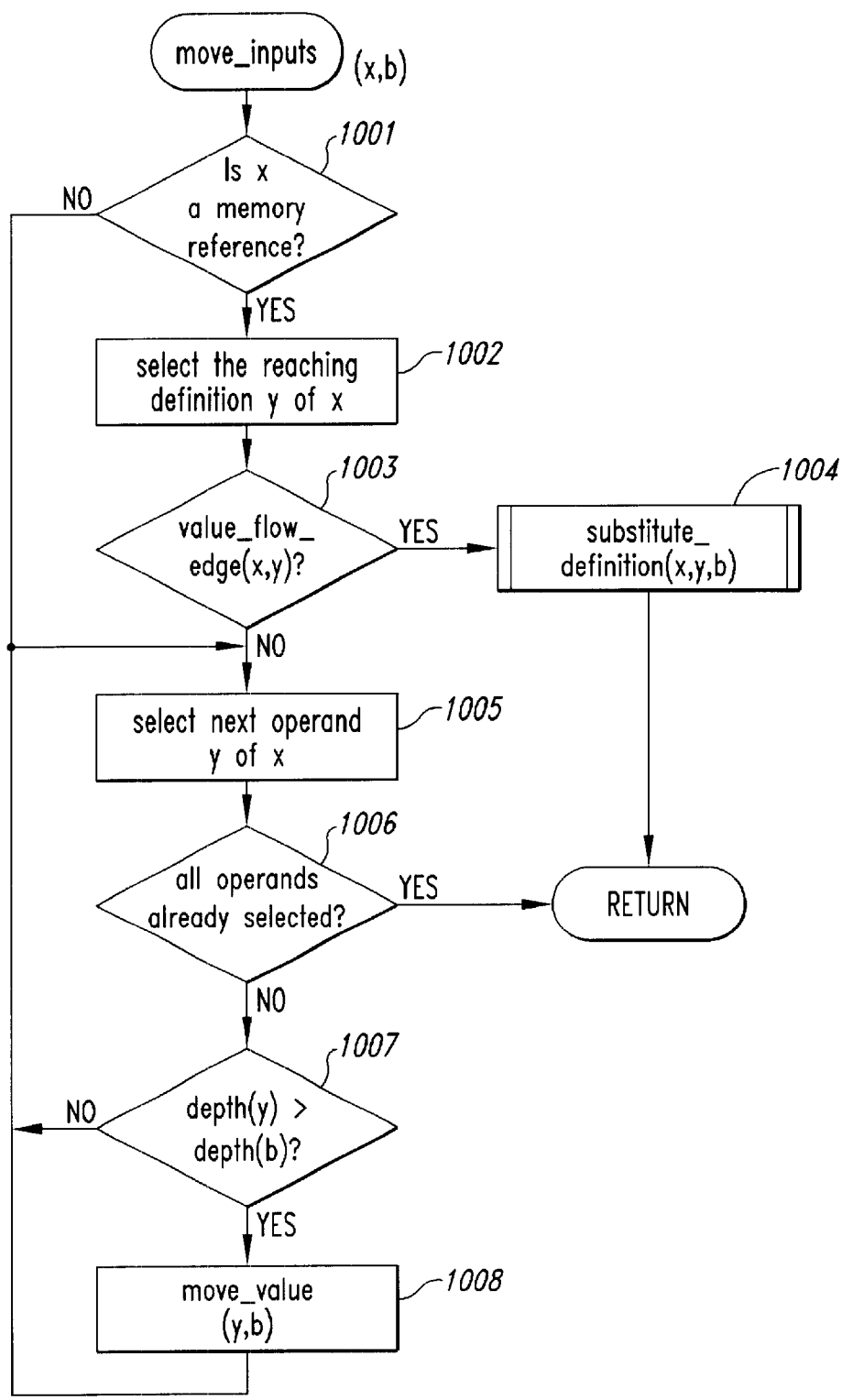
FIG. 10 is a flow diagram of the move_inputs routine.

FIG. 10 is a flow diagram of the move_inputs routine. This routine is passed an expression and its dominating block. The routine rewrites the inputs of the passed expression as needed to allow the expression to be moved to the dominating block. In step 1001, if the passed expression is a memory reference, then the routine continues at step 1002, else the routine continues at step 1005. If the passed expression is a memory reference (e.g., a load), then in step 1002, the routines selects the reaching definition of the passed expression. In step 1003, the routine invokes the value_flow_edge routines passing the passed expression and the selected reaching definition. If the result of the invoked routine is true, then the routine continues at step 1004, else the routine continues at step 1005. In step 1004, the routine invokes the substitute_definition routine passing the passed expression, the selected reaching definition, and the passed block and then returns. The substitute definition routine moves the definition of the expression to a reaching definition. In steps 1005–1008, the routine loops selecting each operand of the passed expression and rewriting it to the passed dominating block. The depth of the operand is greater than the depth of the passed dominating block. In step 1005, the routine selects the next operand of the passed expression. In step 1006, if all the operands have already been selected, then the routine returns, else the routine continues at step 1007. In step 1007, if the depth of the selected operand is greater than the depth of the passed block, then the routine continues that step 1008, else the routine loops to step 1005 to select the next operand. In step 1008, the routine invokes the move_value routine passing the selected operand and the passed block. The routine then loops to step 1005 to select the next operand.

Figure 11:
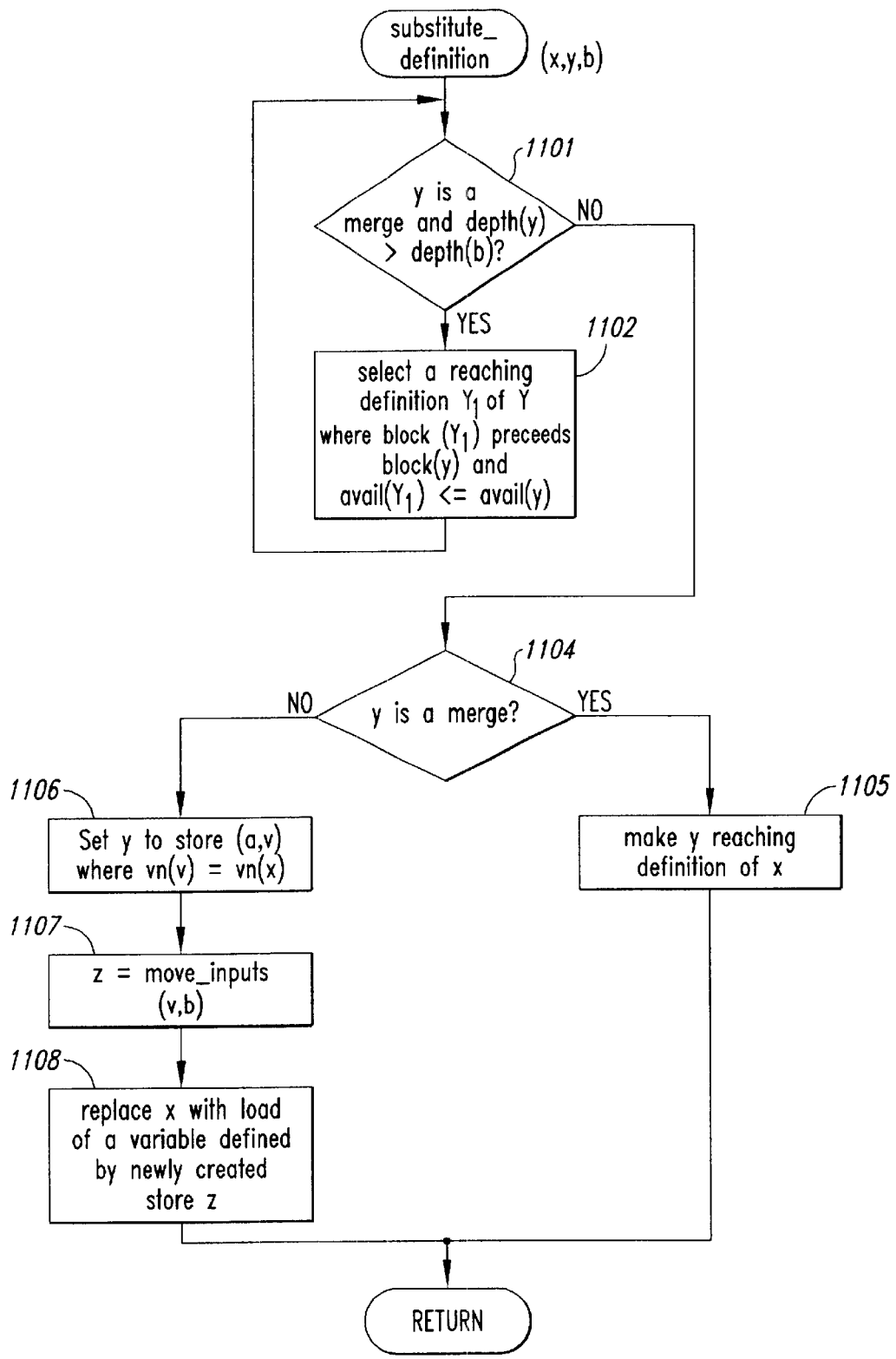
FIG. 11 is a flow diagram of the substitute_definition routine.

FIG. 11 is a flow diagram of the substitute_definition routine. This routine is passed expression, its reaching definition, and the block to which the expression is to be moved. The routine identifies a substitute reaching definition for the passed reaching definition. In steps 1101–1102, if the passed reaching definition is a merge, the routine selects the first reaching definition in a chain of reaching definitions whose depth is less than or equal to the passed block or is not a merge. The routine first selects the passed reaching definition. In step 1101, if the selected reaching definition is a merge and the depth of the selected reaching definition is greater than the depth of the passed block, then the routine continues at step 1102, else the routine continues at step 1104. In step 1102, the routine selects a reaching definition of the currently selected reaching definition such that the block that contains the reaching definition precedes the block of the currently selected reaching definition and the avail of the reaching definition is less than or equal to the avail of the currently selected reaching definition. The routine then loops to step 1101. In step 1104, if the reaching definition has a depth less than or equal to the depth of the passed block, then the routine continues that step 1105, else the routine continues that step 1106. In step 1105, the routine sets the selected reaching definition to be the reaching definition of the passed expression and then returns. In steps 1106–1108, the routine sets the selected reaching definition to be a store of the result of an expression whose value number is the same as that of the passed expression and moves the inputs to the expression to the passed block. In step 1106, the routine sets the selected reaching definition to a store of an expression such that the value number of the expression is the same as the value number of the passed expression. In step 1107, the routine invokes the move_ inputs routine passing the expression of the selected reaching definition and the passed block. In step 1108, the routine replaces the passed expression with a load of the variable for the newly created expression that stores the value into the variable. The routine then returns.

Use of Depth and Avail

The avail and depth values can be used to optimize a computer program in several ways, such as common sub-expression elimination, invariant code motion, and partial redundancy elimination. Common sub-expression elimination refers to the replacing of multiple evaluations of an expression by a single evaluation of that expression and modifying those multiple evaluations to access the result of the single evaluation.

The following illustrates a portion of a program that can benefit from common sub-expression elimination:

a=(x+y)*z-c b=(x+y)*z-d

When the common sub-expression "(x+y)*z" is eliminated, the result is the following:

t=(x+y)*z a=t-c b=t-d

The single evaluation of the sub-expression "(x+y)*z" can be placed in a block based on analysis of depth and avail values. The following illustrates a portion of a program that can benefit from invariant code motion:

for $i = 1, 100$

...

$a = b + c$

...

$a = d$ endfor

If the value of expression "b+c" is the same for each execution of the "for" loop, then the expression "b+c" is invariant within the loop. Thus, the evaluation of that expression can be moved to before the loop, which results in the following:

$t = b + c$ for $i = 1, 100$

...

$a = t$

...

$a = d$ endfor

The following illustrates a portion of a program that can benefit from partial redundancy elimination:

if

...

$a = b + c$

...

endif

...

$d = b + c$

If the expression statement "d=b+c" is executed at least every time that statement "a=b+c," then the evaluation of expression "b+c" can be moved to before the "if" statement. This movement results in the following:

$t = b + c$ if

...

$a = t$ endif

...

$d = t$

One embodiment of the code movement system of the present invention is illustrated by the walk_tree routine. That routine makes one pass through the program and performs various optimizations based on the depth and avail of the expressions and the depth of the blocks. The routine is described using various terms that are defined in the following.

The input program is divided into "nested regions." A nested region is a set of blocks such that if two regions overlap, then one completely encompasses the other. Each block has a pointer ("region(block)") to the smallest (innermost) containing region. The region of the start block is the same as the region of the end block ("region(start)==region(end)"). Each region has a pointer ("outer(region)") to the smallest containing region. The region that contains the start block contains all blocks in the program. The outer region of the region that contains the start block is null ("outer(region(start))==NNULL"). Each region also has a depth value ("depth(region)") that indicates the number of regions that contain that region (i.e., the nesting level). The depth of the region of the start block is zero, and the depth of all the other regions is the depth of its outer region plus one ("depth(outer(region))+1").

A direct dominating block ("direct dominator") of a block is the most immediate dominator of that block such that that block is contained in the innermost region containing the direct dominating block. The direct dominator of a block is designated as "dom*(block)."

A direct post-dominating block ("direct post-dominator") of a block is the most immediate post-dominator of that block such that that block is contained in the innermost region containing the direct post-dominating block. The direct post-dominator of a block is designated as "pdom*(block)."

Each region has a dominating block ("region_dom (region)") that directly dominates all blocks in the region and no other block that is directly dominated by this block directly dominates all the blocks in the region. The dominating block of the regions of the start block is null ("region_dom(region(start))==NULL"). The "least common region" of two blocks is the innermost region that contains both blocks.

Figure 12:
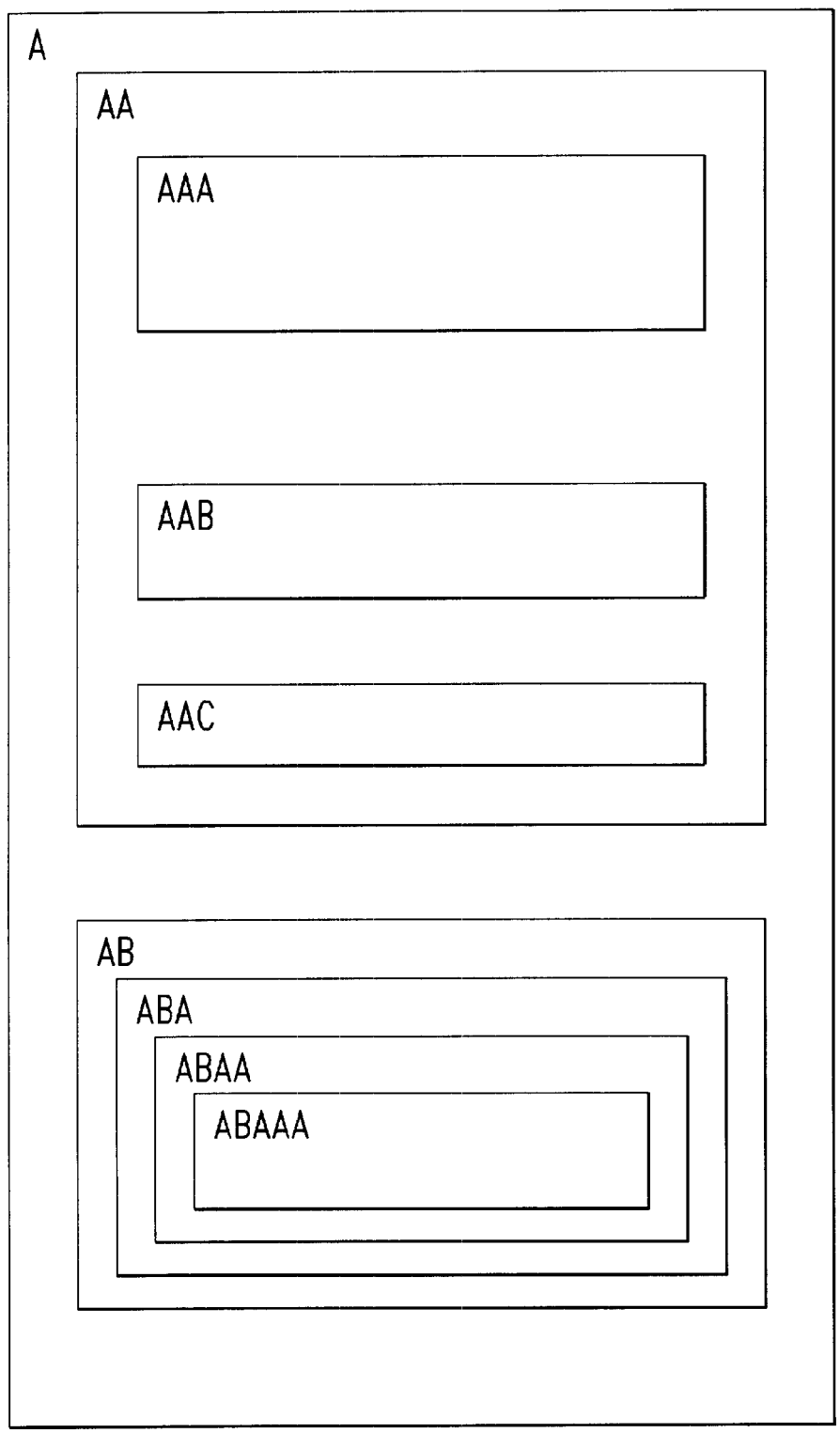
FIG. 12 illustrates the nesting of regions.

FIG. 12 illustrates the nesting of regions. Region A is the outermost region and contains all the blocks in the program. The depth of region A is 0, and it has no outer region. Region A contains regions AA and AB, which are both at depths of 1. Region AA contains regions AAA, AAB, and AAC which are each a depths of 2. Region AA is the least common region of any combination of regions AAA, AAB, and AAC. Region AB contains region ABA at depth 2, which contains region ABAA at depth 3, which contains region ABAAA depth 4. The least common region of regions AAC and ABAAA is region A.

Nested regions include loops, parallel regions, and critical sections. Parallel regions are single-entry and single-exit regions that are identified by either the program or the compiler as being concurrently executable. Critical sections are single-entry and single-exit regions that are associated with exclusive access to a shared resource.

The direct depth ("ddepth") of a block as the depth of a block in a direct dominator tree. The direct depth of the start block is zero ("ddepth(start)==0)"), and the direct depth of all other blocks is the direct depth of its direct dominating block plus one ("ddepth(dom*(block))+1").

The children of a block is the set of all blocks such that the block is the direct dominator of each child block and the child block is not the direct post-dominator of the block, The children of a block is represented by the following equation:

children(x)={y|dom*(y)==x and y !=pdom*(x)}

The next equivalent block of a block, if any, is a block that is directly dominated by the block and that is a direct post-dominator of the block. The next equivalent block of a block is represented by the following equation:

$$\text{next\_equiv}(x) = \begin{cases} y & \text{if } dom^*(y) = x \text{ and } pdom^*(x) = y \\ \text{NULL} & \text{otherwise} \end{cases}$$

The first block of a block is either a block that directly dominates the block and that is directly post-dominated by the block or, if there is no such block, the block itself. The first block of a block is represented by the following equation:

$$\text{first}(x) = \begin{cases} \text{first}(y) & \text{if } y = dom^*(x) \text{ and } pdom^*(y) = x \\ x & \text{otherwise} \end{cases}$$

Current[ ] is an array indexed by value number. Each entry points to an expression or a block or contains null.

Blocks are numbered ("num(block)") such that if a block precedes another block in a forward traversal of the control flow graph (i.e., visited first), then that block has a lower block number than the other block.

Every expression has a speculation level ("spec(e)") that corresponds to the number of a block and represents a limit on how early the expression may be speculated.

Each expression is identified as "safe" or "unsafe" with respect to speculation. For example, integer division by an unknown denominator, stores, and function calls with side effects to memory are unsafe.

Each load from memory is marked as "load_safe" or "load_unsafe." A load that is "load_unsafe" may be speculated, but no use of that load may be speculated. For example, accesses to static variables and static allocated scalar variables are "load-safe," whereas accesses via pointers to subscripted arrays are "load-unsafe" because the pointer may be invalid or the index may be out of range.

A block is a target ("target(block)==TRUE") if and only if the block directly dominates all blocks reachable from that block along paths that do not include the direct post-dominator of the block. The definition of a target is represented by the following equation:

$$\text{target}(x) = \begin{cases} \text{TRUE} & \text{if } \text{root}(x) = x \\ \text{FALSE} & \text{otherwise} \end{cases}$$

The root of a block is the least common direct dominator of the set of successor blocks that do not directly post-dominate the block. This set is represented by the following equation:

{root(y)| y!=pdom*(x) and y is a successor of x}

A sink region marks the end of a subgraph that is dominated by a target. A block is a sink ("sink(block)==TRUE") if and only if there is some block that the blocks directly post-dominates and that is a target. The definition of a sink is represented by the following equation:

sink(b) =
$$\begin{cases} \text{TRUE} & \text{if there is some } x \text{ such that } b = pdom^*(x) \text{ and target}(x) \\ \text{FALSE} & \text{otherwise} \end{cases}$$

The reference of a block ("ref(block)") is the set of value number of all expressions that appear in the block.

The computed set of a block ("comp(block)") is a safe approximation of the set of value numbers of expressions that need to be evaluated after control reaches the block and before control reach the post-dominator of the block or exits the region of the block. The computed set has three types of references: (1) those directly in the block, (2) those that need to occur between the block and its direct post-dominator, and (3) those that occur in or after the direct post-dominator. The computed set of a block is represented by the following equation:

$$comp(b) = ref(b) + needed(b) + pcomp(c)$$

The needed set of a block ("needed(block)") is a subset of the computed set of the block that are needed after the block and before the direct post-dominator of the block. The needed set of a block is represented by the following equation:

needed(b)=intersection (ecomp(b,x)) for all successors x of b

The post-computed set of block ("pcomp(block)") is the set of value numbers of expressions computed in the direct post-dominator of the block if that block is a direct dominator equivalent to the block. The post-computed set of a block is represented by the following equation:

$$pcomp(b) = \begin{cases} comp(pdom^*(b)) & \text{if } dom^*(pdom^*(b)) = b \\ empty & \text{otherwise} \end{cases}$$

The edge computed set of a block and an expression ("ecomp(b,x)") filters the information from a successor to present values from being propagated from a sink or from outside a nesting region. The edge computed set of a block is represented by the following equation:

$$ecomp(b, x) = \begin{cases} empty & \text{if } sink(x) \text{ or } region(b) \text{ does not contain} \\ & region(x) \text{ or } (b, x) \text{ is a back edge} \\ comp(x) & \text{otherwise} \end{cases}$$

The above sets can be computed in a single backwards traversal of the control flow graph.

Figure 13:
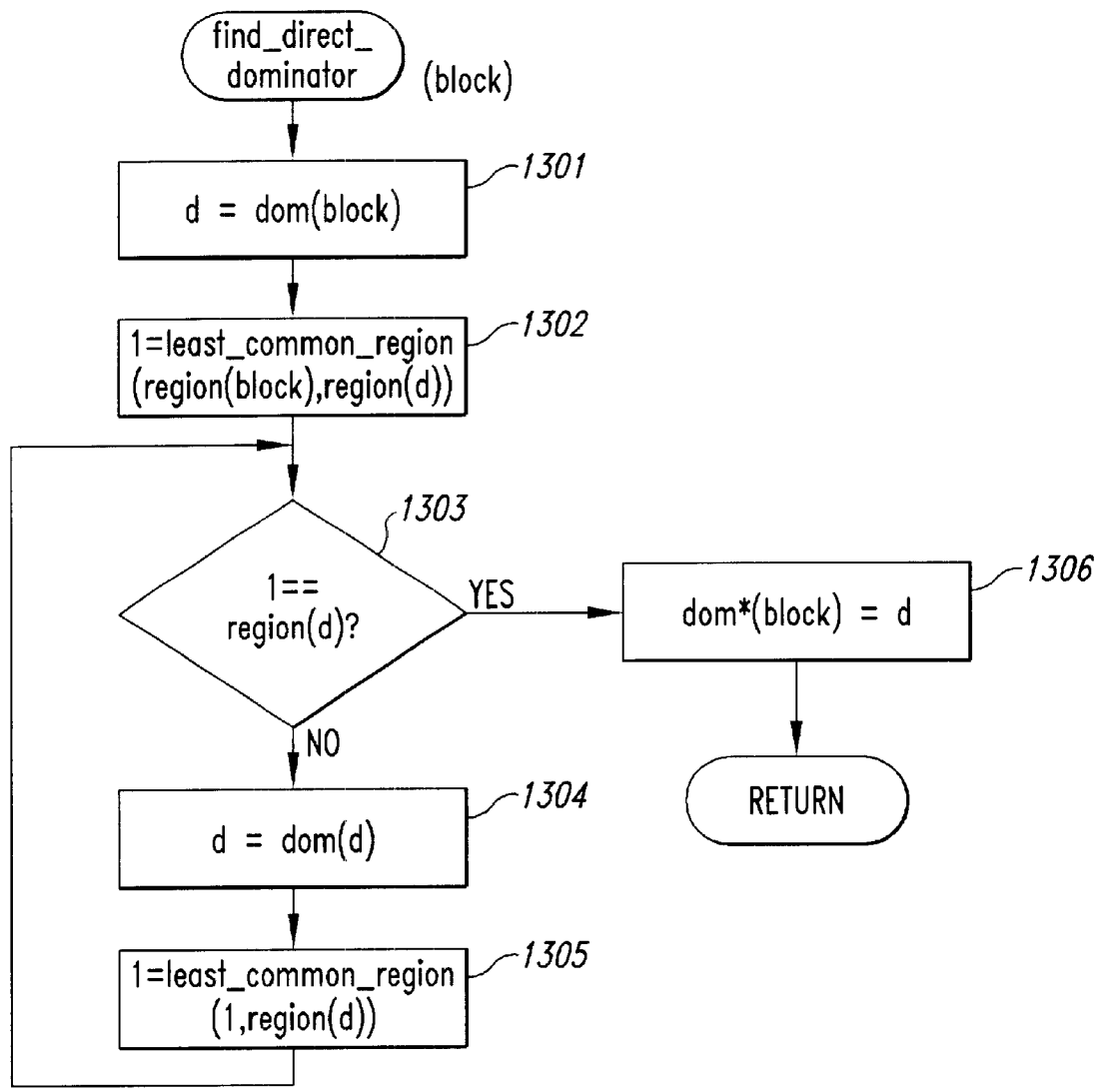
FIG. 13 is a flow diagram of an example implementation of the find_direct_dominator routine.

FIG. 13 is a flow diagram of an example implementation of the find_direct_dominator routine. This routine finds the direct dominator for the passed block. In step 1301, the routine sets the variable d equal to the dominator of the passed block. In step 1302, the routine sets the variable l equal to the least common region of the region of the passed block and the region of the dominator block of the passed block. In step 1303, if the variable l is equal to the region of the variable d, then the routine continues at step 1306, else the routine continues at step 1304. In step 1304, routine sets the variable d to flee value of its dominator. In the step 1305, the routine sets the variable l to the least command region of it and the region of the variable d. The routine then loops to step 1303. In step 1306, the routine sets the direct dominator of the passed block to the block identified by variable d and returns.

Figure 14:
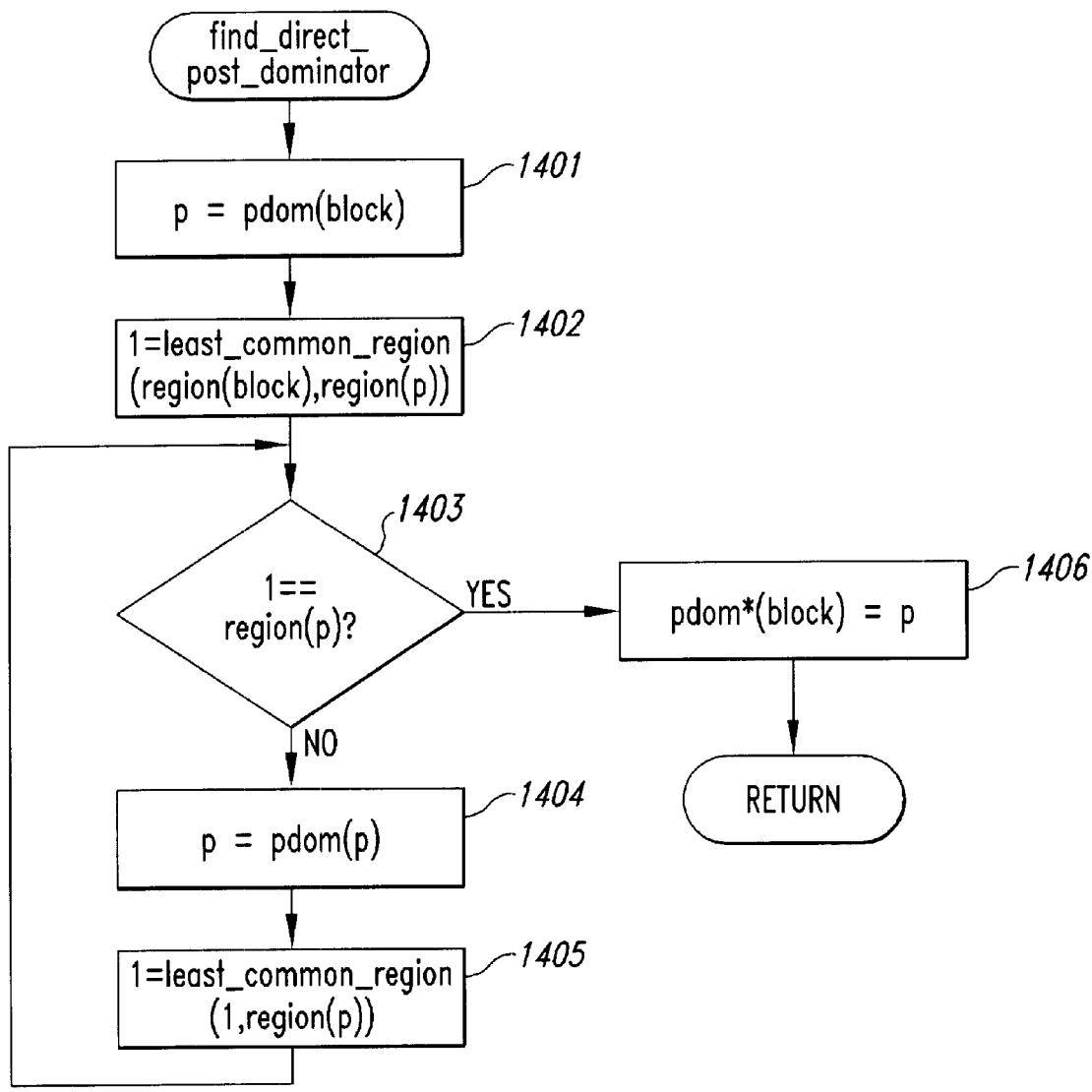
FIG. 14 is a flow diagram of an example implementation of the find_direct_post_dominator routine.

FIG. 14 is a flow diagram of an example implementation of the find_direct_post_dominator routine. This routine finds the direct post-dominator for the passed block. In step 1401, the routine sets the variable p equal to the post-dominator of the passed block. In step 1402, the routine sets the variable l equal to the least common region of the region of the passed block and region of the post-dominator block of the passed block. In step 1403, if the variable l is equal to the region of the variable p, then the routine continues at step 1406, else the routine continues at step 1404. In step 1404, routine sets the variable p to the value of its post-dominator. In the step 1405, the routine sets the variable l to the least common region of it and the region of the variable p. The routine then loops to step 1403. In step 1406, the routine sets the direct post-dominator of the passed block to the block identified variable p and returns.

Figure 15:
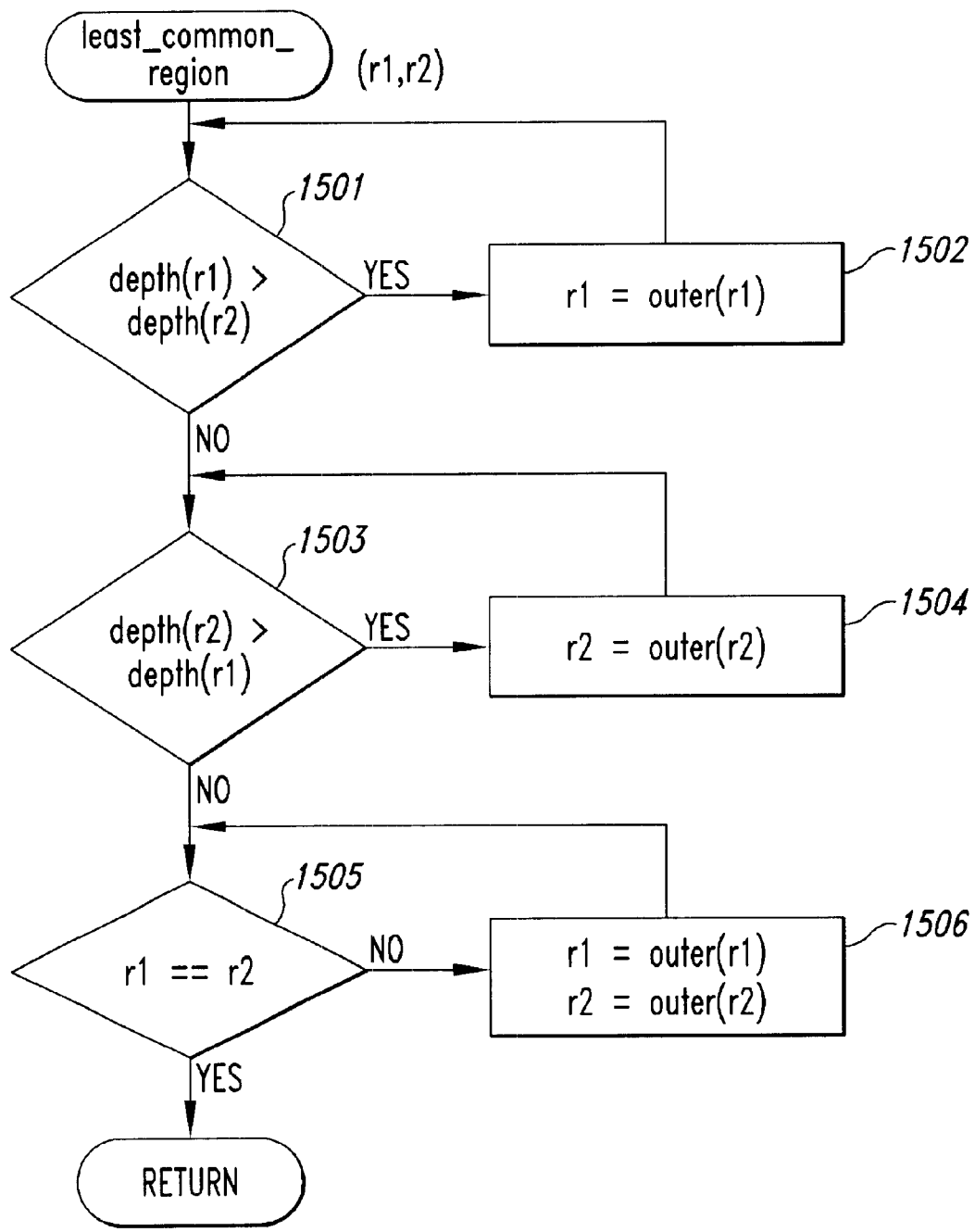
FIG. 15 is a flow diagram of an example implementation of the least_common_region routine.

FIG. 15 is a flow diagram of an example implementation of the least_common_region routine. This routine is passed two regions and determines the least common enclosing region. In steps 1501–1502, the routine selects the innermost, outer region of the first region whose depth is not greater than the depth of the second region. In step 1501, if the depth of the first region is greater than the depth of the second region, then the routine continues at step 1502, else the routine continues at step 1503. In step 1502, the routine sets the first region to its outer region and loops to step 1501. In steps 1503–1504, the routine selects the innermost, outer region of the second whose depth is not greater than the depth of the first region. In step 1502, if the depth of the second region is greater than the depth of the first region, then the routine continues at step 1504, else the routine continues at step 1505. In step 1504, the routine sets the second region equal to its outer region and loops to step 1503. In steps 1505–1506, the routine loops until the least common region is identified. In step 1505, if the first region equals the second region, then the routine returns, else the routine continues at step 1506. In step 1506, the routine sets the first region to its outer region and the second region its outer region and loops to step 1505.

Figure 16:
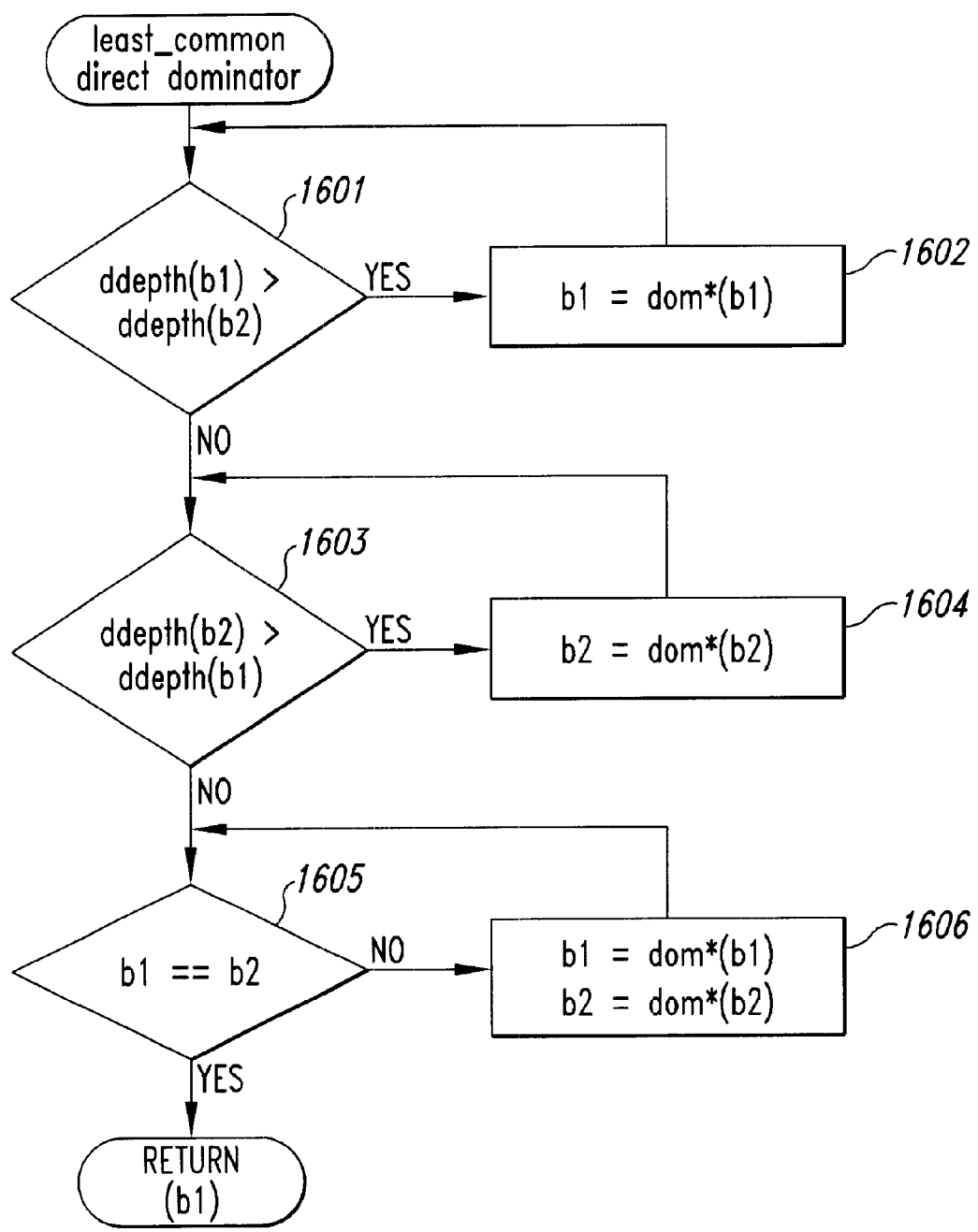
FIG. 16 is a flow diagram of an example implementation of the least_common_direct_dominator routine.

FIG. 16 is a flow diagram of an example implementation of the least_common_direct_dominator routine. This routine is passed two blocks and finds the least common direct dominator of the passed blocks. In steps 1601–1602, the routine selects the direct dominator of the first block whose direct depth is not greater than the direct depth of the second block. In step 1601, if the direct depth of the first block one is greater than the direct depth of the second block, then the routine continues at step 1602, else the routine continues it step 1603. In step 1602, routine selects as the first block the direct dominator of the first block and loops to step 1601. In steps 1603–1604, the routine selects the direct dominator of the second block whose direct depth is not greater than the direct depth of the first block. In step 1603, if the direct depth of the second block is greater then the direct depth of the first block, the routine continues at step 1604, else the routine continues at step 1605. In step 1604, the routine selects as the second block the direct dominator of the second block and loops to step 1603. In steps 1605–1606, the routine finds the least common direct dominator of the first and second blocks. In step 1605, if the first block equals the second block, then the routine returns that block as the least common direct dominator, else the routine continues at step 1606. In step 1606, the routine selects as the first block its direct dominator and selects as the second block its direct dominator and loops to step 1605.

Figure 17:
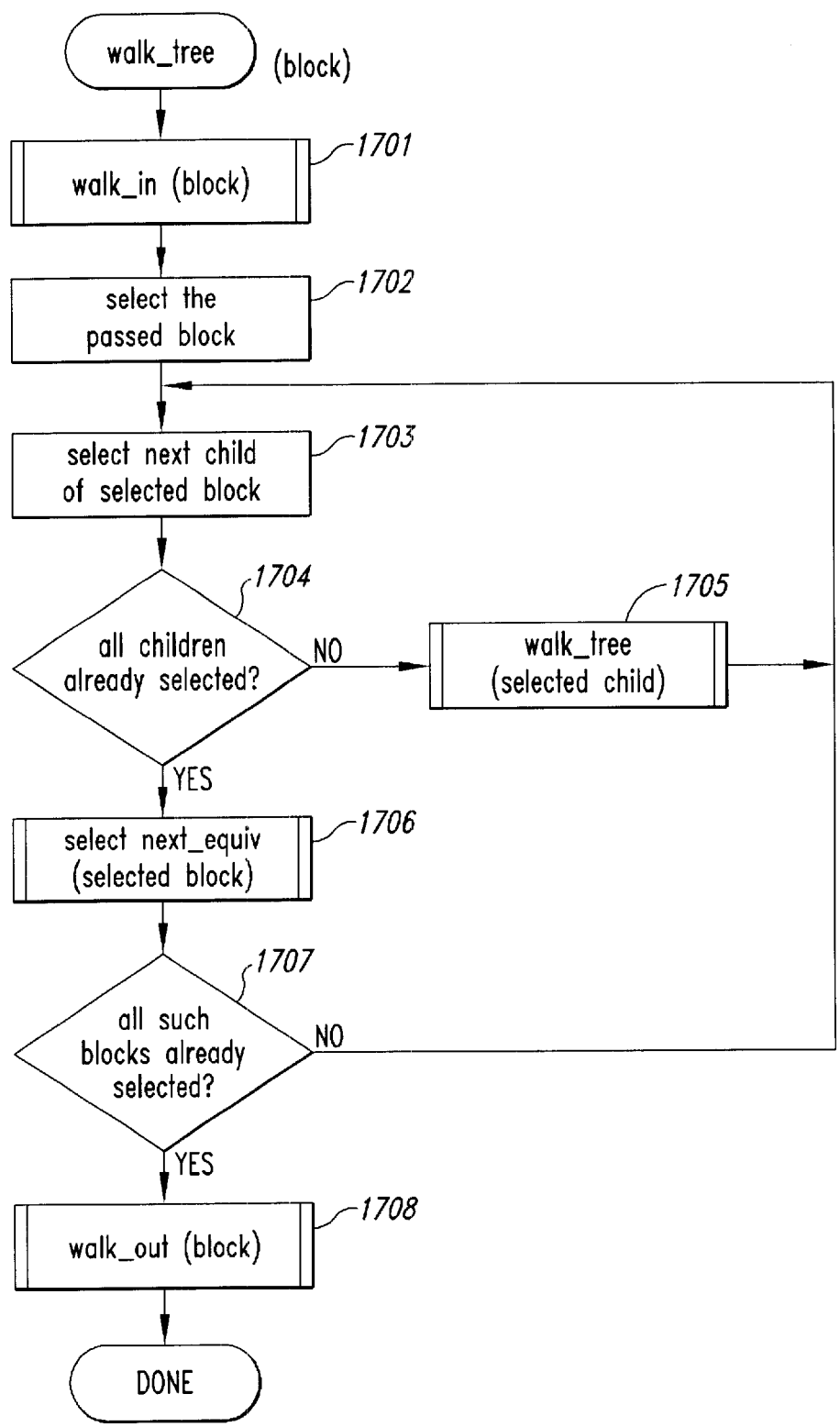
FIG. 17 is a flow diagram of an example implementation of the walk_tree routine.

FIG. 17 is a flow diagram of an example implementation of the walk_tree routine. This routine walks the direct dominator tree and walks equivalent direct post-dominators before children. This routine is passed a block. In step 1701, the routine invokes the routine walk_in routine. In step 1701, the routine selects the passed block. In the steps 1703–1708, the routine loops recursively calling the walk_tree routine for each of the children of the passed block. In step 1703, the routine selects the next child of the currently selected block. In step 1704, if all the children have already been selected, then the routine continues at step 1706, else the routine continues at step 1705. In step 1705, the routine recursively invokes the walk_tree routine and loops to step 1703 to select the next child of the selected block. In step 1706, the routine selects the next equivalent block of the selected block. In step 1707, if all the equivalent blocks have already been selected, then the routine continues at step 1708, else the routine loops to step 1703 to select the next child of the selected block. In step 1708, the routine invokes the walk_out routine passing the passed block. The routine then completes.

Figure 18:
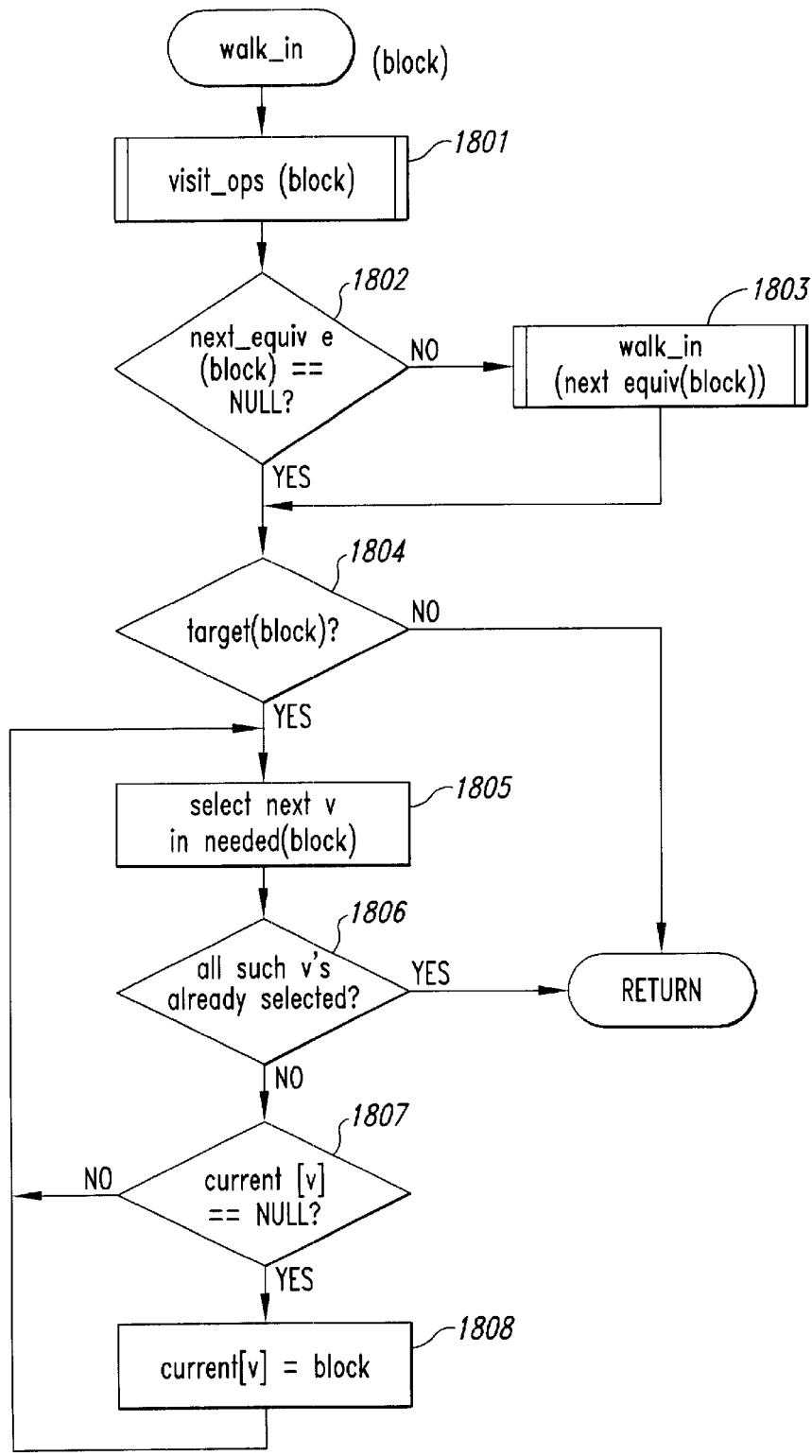
FIG. 18 is a flow diagram of an example implementation of the walk_in routine.

FIG. 18 is a flow diagram of an example implementation of the walk_in routine. This routine is passed a block. This routine notes the available values and attempts to move code or eliminate common sub expressions. In step 1801, the routine invokes the visit_ops routine passing the passed block. In step 1802, if there is no next equivalent block of the passed block, then the routine continues at step 1804, else the routine continues at step 1803. In the step 1803, the routine invokes the walk_in routine passing the next equivalent block of the passed block. In step 1804, if the passed block is a target, then the routine continues at step 1805, else the routine returns. In steps 1805–1808, the routine loops processing the needed values of the selected block. In step 1806, if all such values have already been selected, then the routine returns, else the routine continues at step 1807. In step 1807, if the current of the selected value is null, then the routine continues at step 1808, else the routine loops to step 1805 to select the next value. In step 1808, the routine sets current of the value equal to the passed block and loops to step 1805 to select the next value.

Figure 19:
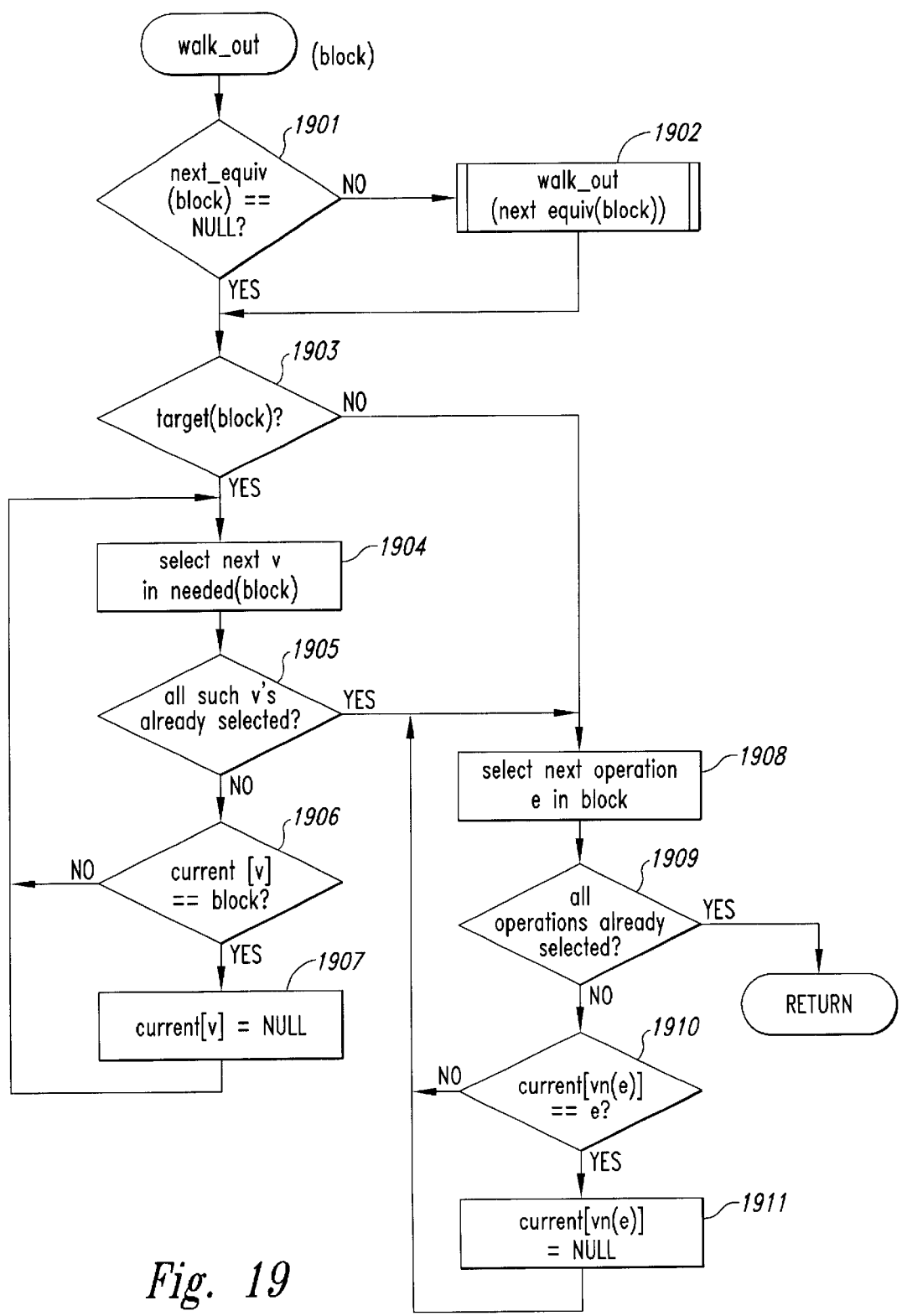
FIG. 19 is a flow diagram of an example implementation of the walk_out routine.

FIG. 19 is a flow diagram of an example implementation of the walk_out routine. This routine is passed a block and clears the available values for the passed block. In step 1901, if there are no next equivalent blocks of the passed block, then the routine continues in step 1903, else the routine continues at step 1902. In step 1902, the routine recursively invokes the walk_out routine passing the next equivalent block of the passed block. In step 1903, if the passed block is a target, then the routine continues at step 1904, else the routine continues at step 1908. In steps 1904–1907, the routine loops selecting the needed values of the passed block. In step 1904, the routine selects the next needed value of the passed block. In step 1905, if all such needed values and have already been selected, then the routine continues at step 1908, else the routine continues at step 1906. In step 1906, if the current of the selected needed value is equal to the passed block, then the routine continues at step 1907, else the routine loops to step 1904 to select the next needed value. In step 1907, the routine sets the current for the selected needed value to null and loops to step 1904 to select the next needed value. In steps 1908–1911, the routine loops processing each of the operations in the passed block. In step 1908, the routine selects the next operation in the passed block. In step 1909, if all such operations have already been selected, then the routine returns, else the routine continues to step 1910. In step 1910, if the current for the value number of the expression is equal to the expression, then the routine sets the current of the value number of the expression equal to null in step 1911. The routine then loops to step 1908 to select the next operation.

Figure 20:
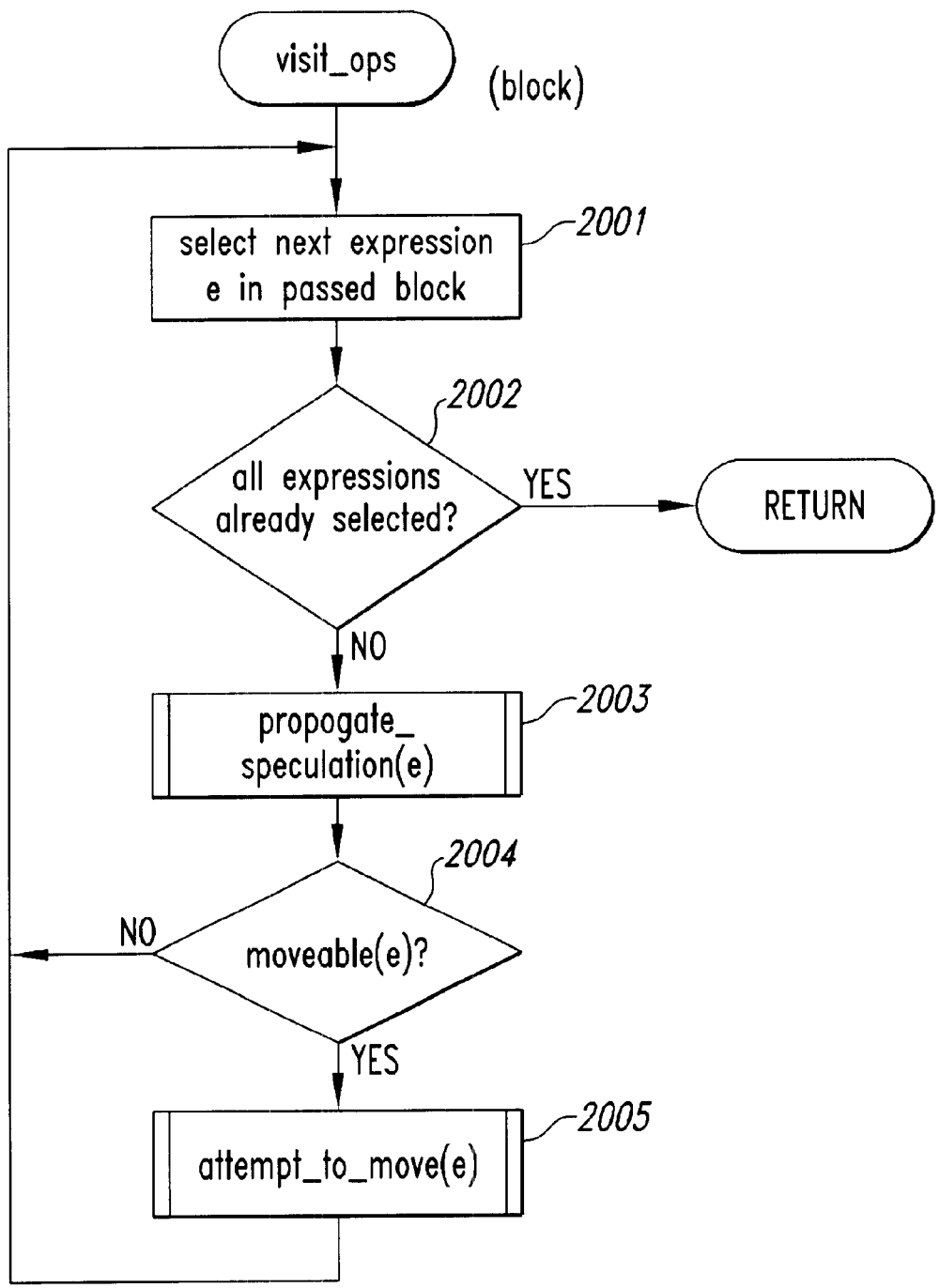
FIG. 20 is an example implementation of the visit_ops routine.

FIG. 20 is an example implementation of the visit_ops routine. This routine attempts to find a better placement for the expressions in the passed block. If the routine does not move an expression, then it records that the expression may be a candidate for a common sub-expression elimination. In step 2001, the routine selects the next expression in the passed block. In step 2002, if all such expressions have already been selected, then the routine returns, else the routine continues at step 2003. In step 2003, the routine invokes the propagate_speculation routine passing the selected expression. In step 2004, if the selected expression is movable, then the routine continues at step 2005, else the routine loops to step 2001 to select the next expression. In step 2005, the routine invokes the attempt_to_move routine passing the selected expression and then loops to step 2001 to select the next expression.

Figure 21:
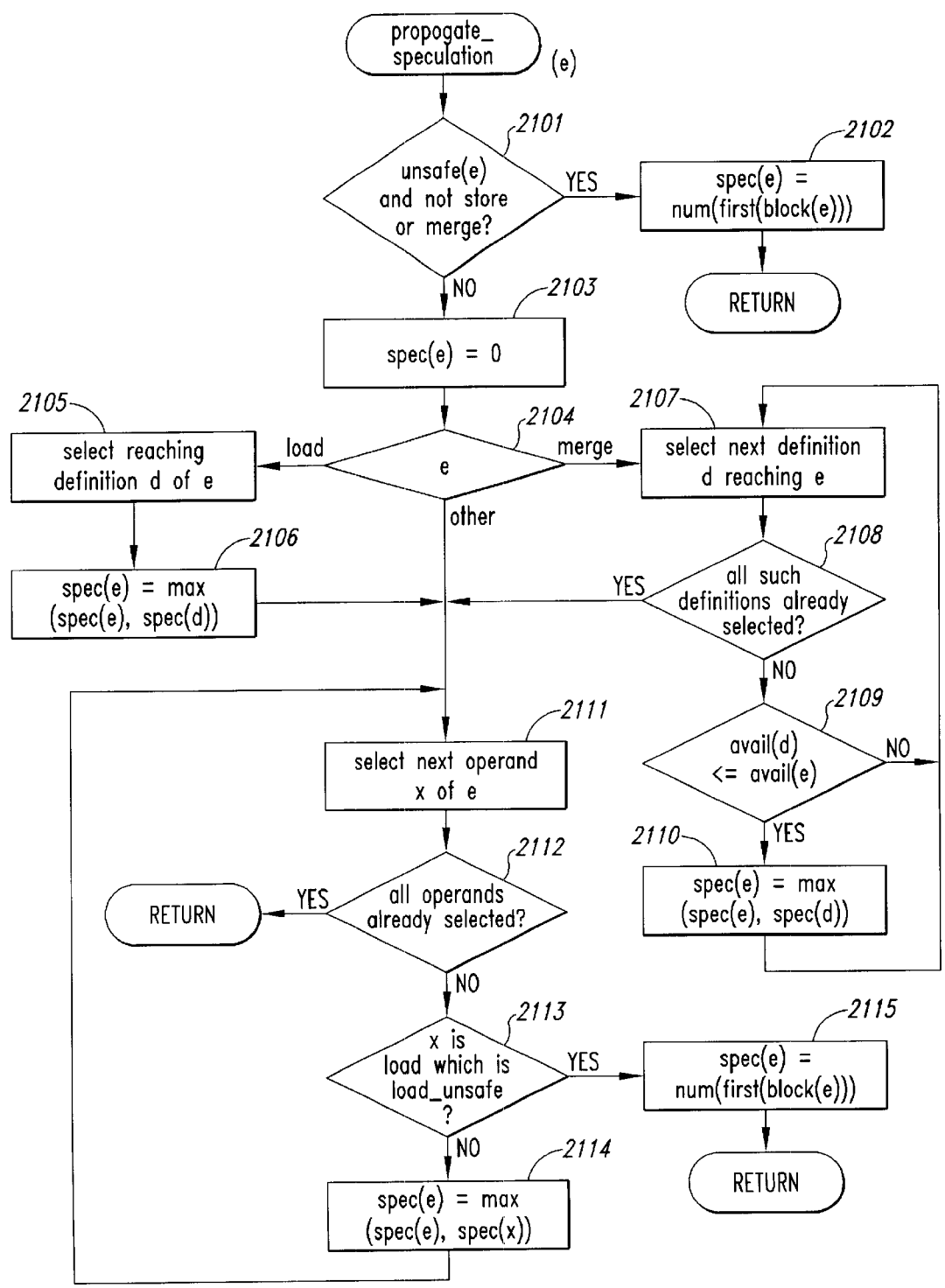
FIG. 21 is a flow diagram of an example implementation of the propagate_speculation routine.

FIG. 21 is a flow diagram of an example implementation of the propagate_speculation routine. This routine determines the limits of speculation for the passed expression based on the limits of its inputs. If the passed expression is a merge or a load, then the routine considers the limits of the reaching definitions since the move_value routine attempts to move those reaching definitions. In step 2101, if the expression is unsafe and not a store or merge, then the routine continues at step 2102, else the routine continues at step 2103. In step 2102, the routine sets the spec of the expression to num(first(block(e))) and then returns. In step 2103, the routine sets the spec of the passed expression to zero. In step 2104, if the passed expression is a merge, then the routine continues at step 2107. If the passed expression is a load, then the routine continues at step 2105. Otherwise, the routine continues at step 2111. In step 2105, the routine selects the reaching definition of the passed expression. In step 2106, the routine sets the spec of the passed expression to the maximum of the current spec of the passed expression and the spec of the selected reaching definition. In steps 2107–2110, the routine loops processing all reaching definitions of the merge. In step 2107, the routine selects the next reaching definition of the passed expression. In step 2108, if all such reaching definitions have already been selected, then the routine continues at step 2111, else the routine continues at step 2109. In step 2109, if the avail of the selected reaching definition is less than or equal to the avail of the passed expression, then the routine continues at step 2110, else the routine loops to step 2107 to select the next reaching definition. In step 2110, the routine sets the spec of the passed expression to the maximum of the current value of the spec of the passed expression and the spec of the reaching definition. The routine then loops to step 2107 to select the next reaching definition. In steps 2111–2114, the routine loops processing each operand of the passed expression. In step 2111, the routine selects of the next operand of the passed expression. In step 2112, if all such operands have already been selected, then the routine returns. In step 2113, if the selected operand is a load which is load unsafe, then the routine continues it step 2115, else the routine continues at step 2114. In step 2114, the routine sets the spec of the passed expression equal to the maximum of the current spec of the passed expression and the spec of the selected operand and loops to step 2111 to select the next operand. In step 2115, the routine sets the spec of the passed expression equal to num(first(block(e))) and returns.

Figure 22:
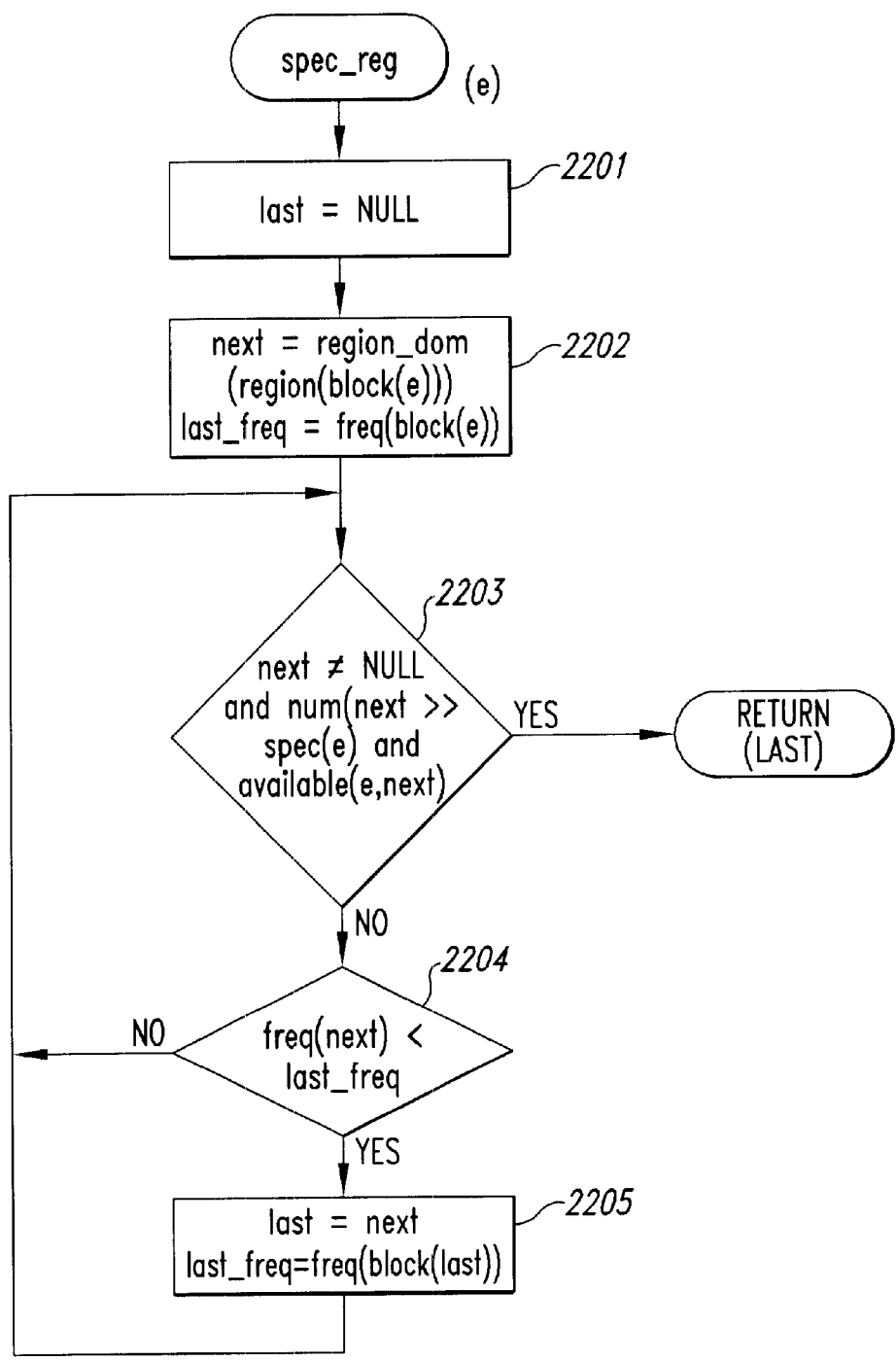
FIG. 22 is a flow diagram of an example implementation of the spec_reg routine.

FIG. 22 is a flow diagram of an example implementation of the spec_reg routine. This routine determines the outermost point with the lowest frequency where the passed expression can be speculated. In step 2201, the routine sets the variable last equal to null. In step 2202, the routine sets the variable next equal to region_dom(region(block(e)) and initializes the variable last_freq to the frequency of the block containing the proposed expression. In step 2203, if the variable next is not equal to null and the number of next is greater than the spec of the passed expression and the passed expression is available at next, then the routine returns the variable last, else the routine continues at step 2204. In step 2204, if the frequency of next is less than the variable last_freq, then the routine continues at step 2205, else the routine loops to step 2203. In step 2205, the routine sets the variable last equal to the variable next, sets the variable last_freq to the frequency of the block last, and loops to step 2203.

Figure 23:
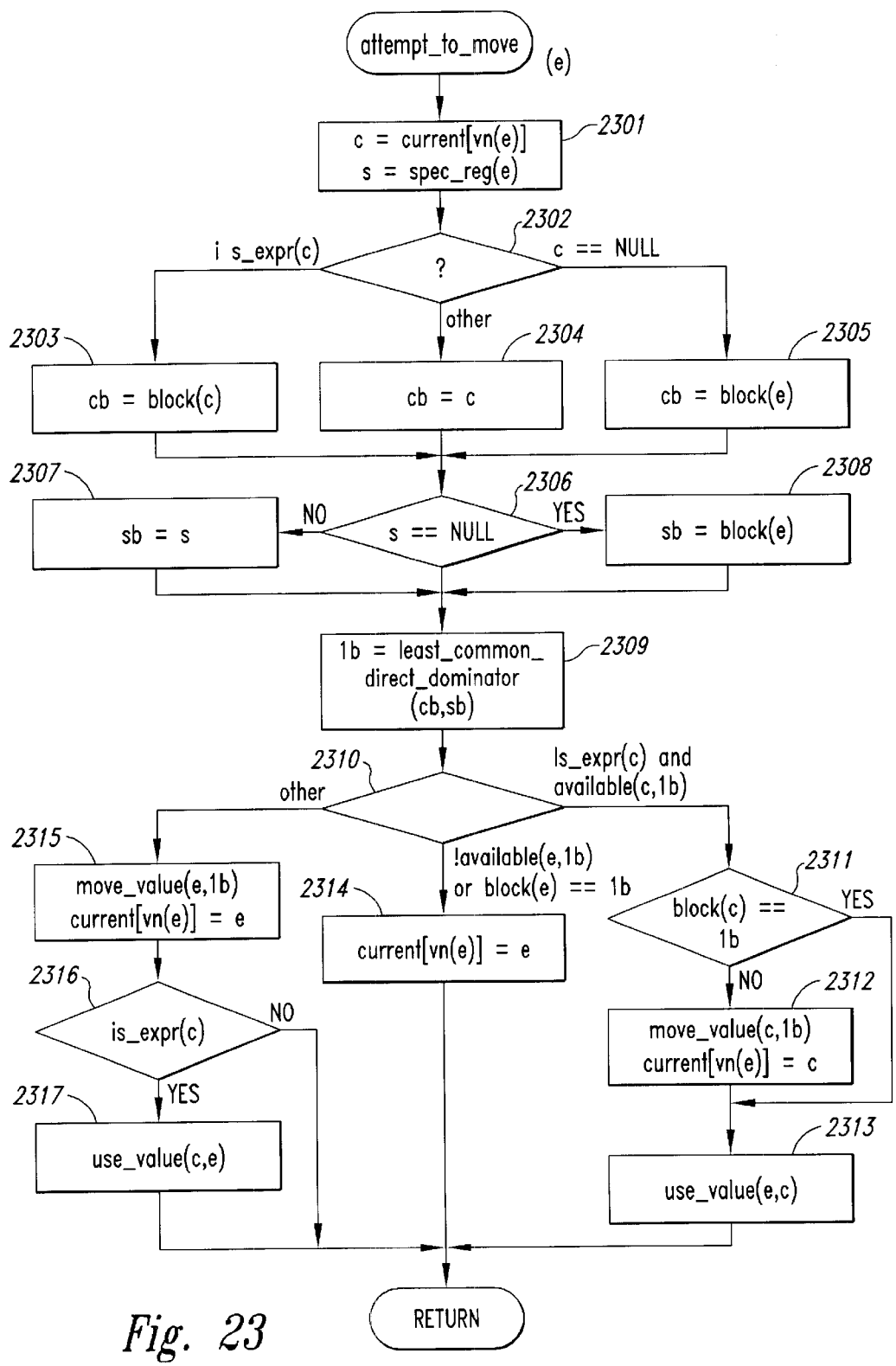
FIG. 23 is a flow diagram of an example implementation of the attempt_to_move routine.

FIG. 23 is a flow diagram of an example implementation of the attempt_to_move routine. This routine is passed an expression and attempts to move the expression speculatively to a point where it is needed or to eliminate its common sub expression with another expression. In step 2301, the routine sets the variable c equal to the current of the value number of the passed expression and sets the variable s equal to the spec_reg of the passed expression. In step 2302, if the variable c is null, then the routine sets the variable cd equal to the block of the passed expression in step 2305. If the variable c is an expression, then the routine sets the variable cd to the block of the variable c in step 2303. Otherwise, the routine sets the variable cd equal to the variable c in step 2304. In step 2306, if the variable s equals null, then the routine sets the variable sb equal to the block of the passed expression in step 2308, else the routine sets the variable sb to the variable s in step 2307. In step 2309, the routine sets the variable lb equal to the least_common_direct_dominator of variable cd and variable sb. In step 2310, if the variable c is an expression and is available at variable lb, then the routine continues at step 2311. Otherwise, if the passed expression is not available at lb or the block of the passed expression e is equal to variable lb then the routine continues at step 2314. Otherwise, the routine continues at step 2315. In step 2311, if the block of the variable c is equal to the variable lb, then the routine continues at step 2313, else the routine continues at step 2312. In step 2312, the routine moves the value of variable c to variable lb and sets the current of the value number of the passed expression to the variable c. In step 2313, the routine invokes the use_value routine passing the passed expression and the variable c and then returns. In step 2314, the routine sets the current of the value number of the passed expression equal to do the passed expression and then returns. In step 2315, the routine moves the value of the passed expression to variable lb and sets the current value of the passed expression equal to the passed expression. In step 2316 if the variable c is an expression, then the routine continues at step 2317, else the routine returns. In step 2317, the routine invoke the use_value routine passing the variable c and the passed expression and then returns.

Figure 24:
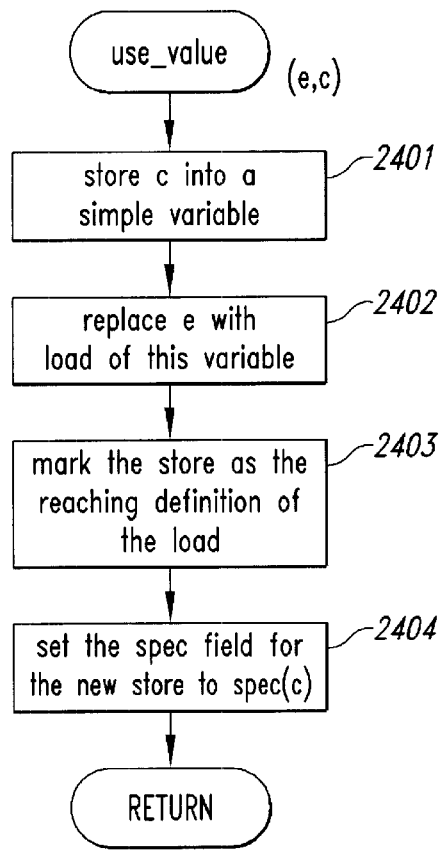
FIG. 24 is flow diagram of an example implementation of the use_value routine.

FIG. 24 is flow diagram of an example implementation of the use_value routine. In step 2401, the routine stores the passed variable c into a simple variable. In step 2402, the routine replaces the passed expression with a load of simple variable. In step 1403, the routine marks the store as a reaching definition of the load. In step 2404, the routine sets the spec for the new store to the spec of the variable c and then returns.

Figure 25:
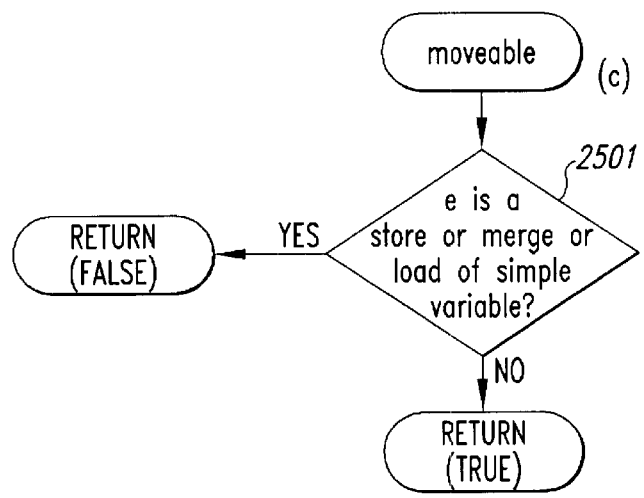
FIG. 25 is a flow diagram of an example implementation of the movable routine.

FIG. 25 is a flow diagram of an example implementation of the movable routine. This routine returns a value of true if the passed expression is movable. In step 2501, if the passed expression is a store or a merge, or a load of the simple variable, then the routine returns false, else the routine returns true.

The following example illustrates common sub-expression elimination with a post-dominator.

B1:
    if() then
B2:        $x = a + b$
    endif
B3:   $y = a + b$

When the first "a+b" is visited, the second "a+b" has already been visited since the second "a+b" is in block B3 which is a next equivalent from a block which dominates that first block B1. So, current[vn(a+b)] points to the second "a+b." Since block B1 is the least common direct dominator of blocks B2 and B3, the second "a+b" is into block B1 and the first "a+b" is replaced by the use of that expression in block B1. The following example illustrates the result of the common sub-expression elimination:

B1:   $t = a + b$
    if() then
B2:        $x = t$
    endif
B3:   $y = t$

The traversal order of the direct dominator tree is illustrated by the following:

```
walk_tree(B1)
    walk_in(B1)
    walk_in(B3)        /* current[vn(a + b)] is set
    walk_tree(B2)
        walk_in(B2)    /* the common sub-expression is eliminated
        walk_out(B2)
    walk_out(B1)
    walk_out(B2)
```

If the above example is modified to insert a conditional loop to block B1 before the second "a+b," it is represented by the following:

B0:
B1:
    if() then
B2:        $x = a + b$
    endif
    if() goto B1
B3:   $y = a + b$ In this example, block B1 and block B2 are in an inner loop (and hence inner region) compared to block B3. The processing is similar to that of the above example, but block B0 is the least common direct dominator of blocks B2 and B3. As a result, the expression "a+b" is placed outside of the loop as shown by the following:

```
B0:    t = a + b
B1:
           if() then
B2:            x = t
           endif
           if() goto B1
B3:    y = t
```

Alternatively, if "a+b" is not available in block B0, no change would be made to the program. Without the notion of nested regions and direct dominators, "a+b" might be incorrectly in block B1 which might raise its execution frequency.

The following example illustrates the use of target and needed.

```
B1:    if() goto B3;
B2:    z = e2
       if() goto B5
B4:    x = e1
       goto B6
B3:    ...
B5:    y = e1
B6:    ...
```

In this example, block B6 is the post-dominator block B1. Since block B1 dominates both successor blocks B2 and B3, block B1 is a target and block B6 is a sink. The needed set of both blocks B1 and B2 contains the value number of expression e1. However, a copy of e1 is placed only in block B1 since it dominates its successors.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for optimizing a computer program, the method comprising:
   identifying a depth of a block of the computer program;
   identifying an availability of an expression of the computer program; and
   modifying the computer program when the identified availability of the expression and the identified depth of the block indicate that the expression can be moved to the block.

2. The method of claim 1 wherein the depth of the block represents a number of dominator blocks of the block.

3. The method of claim 1 wherein the depth of the block represents a level of the block within a dominator tree representation of the computer program.

4. The method of claim 1 wherein the availability of the expression represents the depth of a block to which the expression may be moved.

5. The method of claim 4 wherein the expression may need to be re-written when moved.

6. The method of claim 1 including identifying a depth of the expression of the computer program, the depth of the expression indicating a block to which the expression can be moved without modification.

7. The method of claim 1 wherein the block dominates the expression.

8. The method of claim 1 wherein the identifying of the availability of the expression includes setting the availability of the expression to a maximum of depths of operands of the expression.

9. The method of claim 1 wherein the identifying of the availability of the expression includes when an operation of the expression is a load from memory, setting the availability of the expression to a maximum of depths of operands of the expression and an availability of a reaching definition of the expression.

10. The method of claim 9 wherein the reaching definition is a merge of a scalar loaded by the expression.

11. The method of claim 9 wherein the reaching definition is a store of a value and a value number of the reaching definition is the same as a value number of the expression.

12. The method of claim 1 wherein the identifying of the availability of the expression includes when an operation of the expression is a load from memory, setting the availability of the expression to a maximum of depths of operands of the expression and a depth of a parent block that contains a reaching definition of the expression.

13. The method of claim 12 wherein the reaching definition is neither a merge of a scalar loaded by the expression nor a store of a value such that a value number of the reaching definition is the same as a value number of the expression.

14. The method of claim 1 wherein the identifying of the availability of the expression includes when an operation of the expression is a store into memory, setting the availability of the expression to a depth of a parent block that contains the expression.

15. The method of claim 1 wherein the identifying of the availability of the expression includes when an operation of the expression is a merge of a scalar, setting the availability of the expression to a minimum of the availabilities of reaching definitions of the expression for reaching definitions whose value number is the same as a value number for the expression and a parent block that contains the reaching definition precedes a parent block that contains the expression.

16. The method of claim 1 wherein the identifying of the availability of the expression is performed while visiting blocks of the computer program during a forward traversal of a control flow graph representation of the computer program.

17. The method of claim 1 including identifying a depth of the expression and when the identified depth of the expression and the identified depth of the block indicate that the expression can be moved to the block, moving the expression to the block.

18. The method of claim 17 wherein the moving of the expression includes when the depth of the expression is not greater than the depth of the block, creating a new variable to store a value of the expression, replacing a reference to the expression in a parent block that contains the expression with a reference to the created variable, moving the expression and operands of the expression to the block, and adding to the block a store of the value of the expression into the new variable.

19. The method of claim 17 wherein the moving of the expression includes when the depth of the expression is greater than the depth of the block, moving inputs to the expression, creating a new variable to store a value of the expression, replacing a reference to the expression in a parent block that contains the expression with a reference to the created variable, moving the expression and operands of the expression to the block, and adding to the block a store of the value of the expression into the new variable.

20. The method of claim 19 wherein when the expression is not a memory reference moving to the block each operand of the expression whose depth is greater than the depth of the block.

21. The method of claim 19 wherein when the expression is a memory reference and a reaching definition of the expression is either a merge of a scalar loaded by the expression or a store of a value such that a value number of the reaching definition is the same as a value number of the expression, substituting a reaching definition for a current reaching definition of the expression.

22. The method of claim 21 wherein the substituting of the reaching definition includes selecting as a substitute reaching definition the first reaching definition in a chain of reaching definitions whose depth is less than or equal to the depth of the block or whose operation is not a merge.

23. The method of claim 22 including when the operation of the substitute reaching definition is not a merge, setting the reaching definition to be a store of an expression whose value number is the same as that of the expression, moving inputs of that store expression to the parent block that contains the substitute reaching definition, and replacing the expression with a load of a variable store by the reaching definition.

24. The method of claim 17 wherein the depth of the expression and the depth of the block indicate that the expression can be moved to the block when the depth of the expression is less than or equal to the depth of the block and the block dominates the expression.

25. The method of claim 17 wherein the identifying of the depth of the expression includes setting the depth of the expression to a maximum of depths of operands of the expression.

26. The method of claim 17 wherein the identifying of the depth of the expression includes when an operation of the expression is a load from memory, setting the depth of the expression to a maximum of depths of operands of the expression and depth of a reaching definition of the expression.

27. The method of claim 17 wherein the identifying of the depth of the expression includes when an operation of the expression is a store into memory, setting the depth of the expression to a depth of a parent block that contains the expression.

28. The method of claim 17 wherein the identifying of the depth of the expression is performed while visiting blocks of the computer program during a forward traversal of a control flow graph representation of the computer program.

29. A method in a computer system for optimizing a computer program, the method comprising:
identifying a depth of a block of the computer program;
identifying an availability of an expression of the computer program; and
modifying the computer program when the identified availability of the expression and the identified depth of the block indicate that the expression can be moved to the block wherein the identified availability of the expression and the identified depth of the block indicate that the expression can be moved to the block when the identified availability of the expression is less than or equal to the identified depth of the block.

30. A method in a computer system for determining availability of expressions of a computer program, the method comprising:
for blocks visited during a forward traversal of a control flow graph representation of the computer program,
for expressions of the block,
setting the availability of expression to the latest availability of its operands, and
when the operation of the expression is a load from memory, setting the availability of the expression based on a reaching definition of the load.

31. The method of claim 30 including storing the set availability of each expression along with a representation of the computer program.

32. The method of claim 30 wherein the setting of the availability of the expression based on the reaching definition includes setting the availability of the expression to the availability of the reaching definition when the reaching definition is a store of the result of an expression with the same value as the value of the expression.

33. The method of claim 30 wherein the setting of the availability of the expression based on the reaching definition includes setting the availability of the expression to the availability of the reaching definition when the reaching definition is a merge of a scalar loaded by the expression.

34. The method of claim 30 wherein the setting of the availability of the expression based on the reaching definition includes setting the availability of the expression to the later of the availability of all the operands of the expression and of the block of the reaching expression.

35. The method of claim 30 including when the operation of the expression represents a merge of a scalar, setting the availability of the expression to the earlier of the availability of all the operands of the expression and of the earliest availability of the reaching definitions that store the same value as the result of the expression.

36. The method of claim 30 wherein a representation of the expression can be moved to a block whose dominator depth is after the availability.

37. A method in a computer system for identifying a direct dominator of a block of a computer program, the method comprising:
identifying the closest dominator of the block such that the block is contained in the innermost region containing that dominator; and
setting the direct dominator to the identified closest dominator.

38. A method in a computer system for identifying a direct dominator of a block of a computer program, the method comprising:
identifying the closest dominator of the block such that the block is contained in the innermost region containing that dominator by
selecting the closest dominator of the block;
selecting the least common region that contains the region that contains the block and the region that contains the selected dominator of the block; and
while the selected least common region is not the same as the innermost region of the selected dominator of the block, selecting the next closest dominator of the block; and
selecting the least common region that contains the previously selected least common region and the region that contains the selected dominator of the block; and
setting the direct dominator to the identified closest dominator.

39. A computer system for identifying the availability of an expression in a computer program, the availability of the expression indicating a location within the computer program to which the expression can be moved with rewriting the expression, comprising:
a component for setting the availability of the expression to a maximum of depths of operands of the expression;
a component for, when an operation of the expression is a load from memory, setting the availability of the expression to a maximum of depths of operands of the expression and an availability of a reaching definition of the expression; and
a component for, when an operation of the expression is a store into memory, setting the availability of the expression to a depth of a parent block that contains the expression.

40. The computer system of claim 29 wherein the reaching definition is a merge of a scalar loaded by the expression.

41. The computer system of claim 39 wherein the reaching definition is a store of a value and a value number of the reaching definition is the same as a value number of the expression.

42. The computer system of claim 39 wherein the reaching definition is neither a merge of a scalar loaded by the expression nor a store of a value such that a value number of the reaching definition is the same as a value number of the expression.

43. The computer system of claim 39 including a component for, when an operation of the expression is a merge of a scalar, setting the availability of the expression to a minimum of the availabilities of reaching definitions of the expression for reaching definitions whose value number is the same as a value number for the expression and a parent block that contains the reaching definition precedes a parent block that contains the expression.

44. The computer system of claim 39 wherein the identifying of the availability of the expression is performed while visiting blocks of the computer program during a forward traversal of a control flow graph representation of the computer program.

45. A computer-readable medium containing instructions for controlling a computer system to modify a computer program, by a method comprising:
identifying a depth of a block of the computer program;
identifying an availability of an expression of the computer program; and
when the identified availability of the expression and the identified depth of the block indicate that the expression can be moved to the block, moving a rewritten version of the expression to the block.

46. The computer-readable medium of claim 45 wherein the availability of the expression and the depth of the block indicate that the rewritten version of the expression can be moved to the block when the availability of the expression is less than or equal to the depth of the block and the block dominates the expression.

47. The computer-readable medium of claim 45 wherein the identifying of the availability of the expression includes setting the availability of the expression to a maximum of depths of operands of the expression.

48. The computer-readable medium of claim 45 wherein the identifying of the availability of the expression includes when an operation of the expression is a load from memory, setting the availability of the expression to a maximum of depths of operands of the expression and an availability of a reaching definition of the expression.

49. The computer-readable medium of claim 48 wherein the reaching definition is a merge of a scalar loaded by the expression.

50. The computer-readable medium of claim 48 wherein the reaching definition is a store of a value and a value number of the reaching definition is the same as a value number of the expression.

51. The computer-readable medium of claim 45 wherein the identifying of the availability of the expression includes when an operation of the expression is a load from memory, setting the availability of the expression to a maximum of depths of operands of the expression and a depth of a parent block that contains a reaching definition of the expression.

52. The computer-readable medium of claim 51 wherein the reaching definition is neither a merge of a scalar loaded by the expression nor a store of a value such that a value number of the reaching definition is the same as a value number of the expression.

53. The computer-readable medium of claim 45 wherein the identifying of the availability of the expression includes when an operation of the expression is a store into memory, setting the availability of the expression to a depth of a parent block that contains the expression.

54. The computer-readable medium of claim 45 wherein the identifying of the availability of the expression includes when an operation of the expression is a merge of a scalar, setting the availability of the expression to a minimum of the availabilities of reaching definitions of the expression for reaching definitions whose value number is the same as a value number for the expression and a parent block that contains the reaching definition precedes a parent block that contains the expression.

55. The computer-readable medium of claim 45 wherein the identifying of the availability of the expression is performed while visiting blocks of the computer program during a forward traversal of a control flow graph representation of the computer program.

56. The computer-readable medium of claim 45 including identifying a depth of the expression and when the identified depth of the expression and the identified depth of the block indicate that the expression can be moved to the block, moving the expression to the block.

57. The computer-readable medium of claim 56 wherein the moving of the expression includes when the depth of the expression is not greater than the depth of the block, creating a new variable to store a value of the expression, replacing a reference to the expression in a parent block that contains the expression with a reference to the created variable, moving the expression and operands of the expression to the block, and adding to the block a store of the value of the expression into the new variable.

58. The computer-readable medium of claim 56 wherein the moving of the expression includes when the depth of the expression is greater than the depth of the block, moving inputs to the expression, creating a new variable to store a value of the expression, replacing a reference to the expression in a parent block that contains the expression with a reference to the created variable, moving the expression and operands of the expression to the block, and adding to the block a store of the value of the expression into the new variable.

59. The computer-readable medium of claim 58 wherein when the expression is not a memory reference moving to the block each operand of the expression whose depth is greater than the depth of the block.

60. The computer-readable medium of claim 58 wherein when the expression is a memory reference and a reaching definition of the expression is either a merge of a scalar loaded by the expression or a store of a value such that a value number of the reaching definition is the same as a value number of the expression, substituting a reaching definition for a current reaching definition of the expression.

61. The computer-readable medium of claim 60 wherein the substituting of the reaching definition includes selecting as a substitute reaching definition the first reaching definition in a chain of reaching definitions whose depth is less than or equal to the depth of the block or whose operation is not a merge.

62. The computer-readable medium of claim 61 including when the operation of the substitute reaching definition is not a merge, setting the reaching definition to be a store of an expression whose value number is the same as that of the expression, moving inputs of that store expression to the parent block that contains the substitute reaching definition, and replacing the expression with a load of a variable store by the reaching definition.

63. The computer-readable medium of claim 56 wherein the depth of the expression and the depth of the block indicate that the expression can be moved to the block when the depth of the expression is less than or equal to the depth of the block and the block dominates the expression.

64. The computer-readable medium of claim 56 wherein the identifying of the depth of the expression includes setting the depth of the expression to a maximum of depths of operands of the expression.

65. The computer-readable medium of claim 56 wherein the identifying of the depth of the expression includes when an operation of the expression is a load from memory, setting the depth of the expression to a maximum of depths of operands of the expression and depth of a reaching definition of the expression.

66. The computer-readable medium of claim 56 wherein the identifying of the depth of the expression includes when an operation of the expression is a store into memory, setting the depth of the expression to a depth of a parent block that contains the expression.

67. A method in a computer system for modifying a computer program, the method comprising:
   identifying a depth of a block of the computer program;
   identifying a depth of an expression of the computer program; and
   when the identified depth of the expression is less than or equal to the depth of the block, moving the expression to the block.

68. The method of claim 67 wherein the block dominates the expression.

69. The method of claim 67 wherein the identifying of the depth of the expression includes setting the depth of the expression to a maximum of depths of operands of the expression.

70. The method of claim 67 wherein the moving of the expression includes when the depth of the expression is not greater than the depth of the block, creating a new variable to store a value of the expression, replacing a reference to the expression in a parent block that contains the expression with a reference to the created variable, moving the expression and operands of the expression to the block, and adding to the block a store of the value of the expression into the new variable.

71. The method of claim 67 wherein the moving of the expression includes when the depth of the expression is greater than the depth of the block, moving inputs to the expression, creating a new variable to store a value of the expression, replacing a reference to the expression in a parent block that contains the expression with a reference to the created variable, moving the expression and operands of the expression to the block, and adding to the block a store of the value of the expression into the new variable.

72. The method of claim 71 wherein when the expression is not a memory reference moving to the block each operand of the expression whose depth is greater than the depth of the block.

73. The method of claim 71 wherein when the expression is a memory reference and a reaching definition of the expression is either a merge of a scalar loaded by the expression or a store of a value such that a value number of the reaching definition is the same as a value number of the expression, substituting a reaching definition for a current reaching definition of the expression.

74. The method of claim 71 wherein the substituting of the reaching definition includes selecting as a substitute reaching definition the first reaching definition in a chain of reaching definitions whose depth is less than or equal to the depth of the block or whose operation is not a merge.

75. The method of claim 74 including when the operation of the substitute reaching definition is not a merge, setting the reaching definition to be a store of an expression whose value number is the same as that of the expression, moving inputs of that store expression to the parent block that contains the substitute reaching definition, and replacing the expression with a load of a variable store by the reaching definition.

76. The method of claim 67 wherein the depth of the expression and the depth of the block indicate that the expression can be moved to the block when the depth of the expression is less than or equal to the depth of the block and the block dominates the expression.

77. The method of claim 67 wherein the identifying of the depth of the expression includes setting the depth of the expression to a maximum of depths of operands of the expression.

78. The method of claim 67 wherein the identifying of the depth of the expression includes when an operation of the expression is a load from memory, setting the depth of the expression to a maximum of depths of operands of the expression and depth of a reaching definition of the expression.

79. The method of claim 67 wherein the identifying of the depth of the expression includes when an operation of the expression is a store into memory, setting the depth of the expression to a depth of a parent block that contains the expression.

80. The method of claim 67 wherein the identifying of the depth of the expression is performed while visiting blocks of the computer program during a forward traversal of a control flow graph representation of the computer program.

* * * * *

UNITED STATES PATENT AND TRADEMARK OFFICE
CERTIFICATE OF CORRECTION

PATENT NO. : 6,415,433 B1
DATED : July 2, 2002
INVENTOR(S) : Callahan, II et al.

It is certified that error appears in the above-identified patent and that said Letters Patent is hereby corrected as shown below:

Column 3,
Line 15, "routine," should be -- routine. --;

Column 4,
Line 11, "light" should be -- right --;

Column 7,
Line 17, "strep" should be -- step --;

Column 11,
Line 59, "block," should be -- block --;

Column 13,
Line 46, "flee" should read -- the --;

Column 22,
Line 14, "operands," should be -- operands; --;

Column 23,
Line 24, "29" should be -- 39 --;

Signed and Sealed this

Fourth Day of February, 2003

JAMES E. ROGAN
*Director of the United States Patent and Trademark Office*